United States Patent [19]
Crespi et al.

[11] Patent Number: 6,130,005
[45] Date of Patent: Oct. 10, 2000

[54] HEAT TREATED SILVER VANADIUM OXIDE FOR USE IN IMPLANTABLE MEDICAL DEVICES, ARTICLES AND METHODS

[75] Inventors: Ann M. Crespi, Minneapolis; Kaimin Chen, New Brighton, both of Minn.

[73] Assignee: Medtronic, Inc., Minneapolis, Minn.

[21] Appl. No.: 09/089,819

[22] Filed: Jun. 3, 1998

Related U.S. Application Data

[62] Division of application No. 08/792,416, Feb. 3, 1997, Pat. No. 5,955,218.
[60] Provisional application No. 60/034,649, Dec. 18, 1996.

[51] Int. Cl.[7] .................................................. H01M 4/54
[52] U.S. Cl. ........................ 429/219; 429/231.1; 423/593
[58] Field of Search ..................... 423/593, 604; 429/219, 231.1

[56] References Cited

U.S. PATENT DOCUMENTS

| | | | |
|---|---|---|---|
| 4,016,338 | 4/1977 | Lauck | 429/149 |
| 4,158,722 | 6/1979 | Lauck et al. | 429/194 |
| 4,310,609 | 1/1982 | Liang et al. | 429/194 |
| 4,391,729 | 7/1983 | Liang et al. | 252/182.1 |
| 4,542,083 | 9/1985 | Cava et al. | 429/218 |
| 4,675,260 | 6/1987 | Sakurai et al. | 429/191 |
| 4,751,157 | 6/1988 | Uchiyama et al. | 429/194 |
| 4,751,158 | 6/1988 | Uchiyama et al. | 429/194 |
| 4,803,137 | 2/1989 | Miyazaki et al. | 429/194 |
| 4,830,940 | 5/1989 | Keister et al. | 429/194 |
| 4,964,877 | 10/1990 | Keister et al. | 29/623.1 |
| 4,965,151 | 10/1990 | Takeda et al. | 429/191 |
| 5,194,342 | 3/1993 | Bito et al. | 429/191 |
| 5,221,453 | 6/1993 | Crespi | 204/291 |
| 5,298,349 | 3/1994 | Takeuchi | 429/219 |
| 5,389,469 | 2/1995 | Passaniti et al. | 429/206 |
| 5,389,472 | 2/1995 | Takeuchi et al. | 429/219 |
| 5,439,760 | 8/1995 | Howard et al. | 429/94 |
| 5,458,997 | 10/1995 | Crespi et al. | 429/219 |
| 5,472,810 | 12/1995 | Takeuchi et al. | 429/218 |
| 5,498,494 | 3/1996 | Takeuchi et al. | 429/219 |
| 5,498,495 | 3/1996 | Takada et al. | 429/219 |
| 5,512,214 | 4/1996 | Koksbang | 252/506 |
| 5,516,340 | 5/1996 | Takeuchi et al. | 29/623.1 |
| 5,545,497 | 8/1996 | Takeuchi et al. | 429/219 |
| 5,558,680 | 9/1996 | Takeuchi et al. | 29/623.1 |
| 5,567,538 | 10/1996 | Oltman et al. | 429/27 |

FOREIGN PATENT DOCUMENTS

| | | | |
|---|---|---|---|
| 0 630 065 A1 | 5/1994 | European Pat. Off. | H01M 4/48 |
| 0 638 946 A2 | 7/1994 | European Pat. Off. | H01M 4/58 |
| 7-025550 | 3/1995 | Japan | C01G 31/00 |

OTHER PUBLICATIONS

R.A. Leising et al., "Solid–State Cathoe Materials for Lithium Batteries: Effect of Synthesis Temperature on the Physical and Electrochemical Properties of Silver Vanadium Oxide", *Chem. of Materials*, 5, 738–742 (1993) (no month).

H.W. Zandbergen et al., "Two Structures of $Ag_{2-x}V_4O_{11}$, Determined by High Resolution Electron Microscopy", *J. of Solid State Chem.*, 110, 167–175 (1994) (no month).

*Primary Examiner*—Carol Chaney
*Attorney, Agent, or Firm*—Thomas F. Woods; Harold R. Patton

[57] ABSTRACT

The invention provides heat-treated silver vanadium oxide for use in the cathodes of electrochemical cells, particularly in implantable medical devices. The heat-treated silver vanadium oxide is capable of being pressed into a pellet having a pressed pellet density of about 3.10 g/cm$^3$ to about 3.45 g/cm$^3$ when about 2 grams of the heat-treated silver vanadium oxide are uniaxially pressed into a pellet using a 1.6 cm diameter cylindrical die with a 7500 pound force applied for 5 seconds.

13 Claims, 25 Drawing Sheets x600 x3,000 x600 x3,000

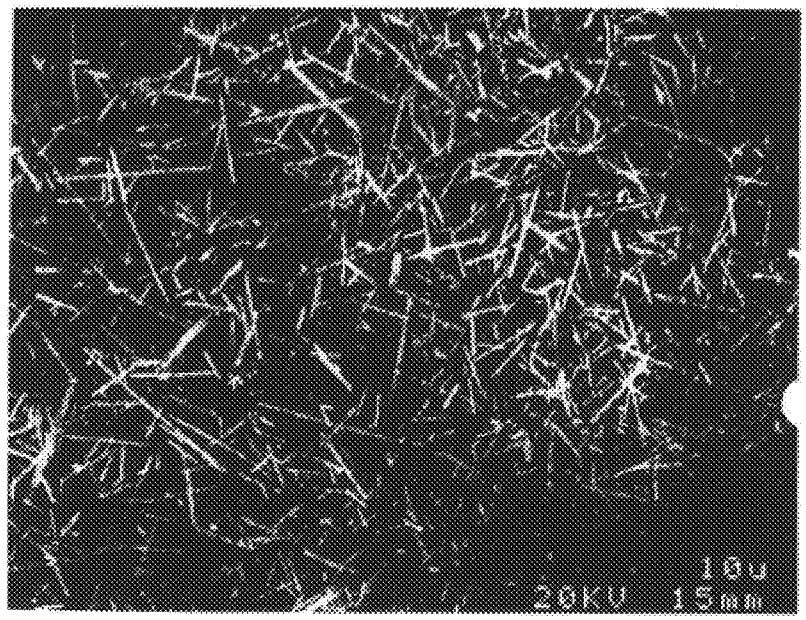
FIG. 7A x600
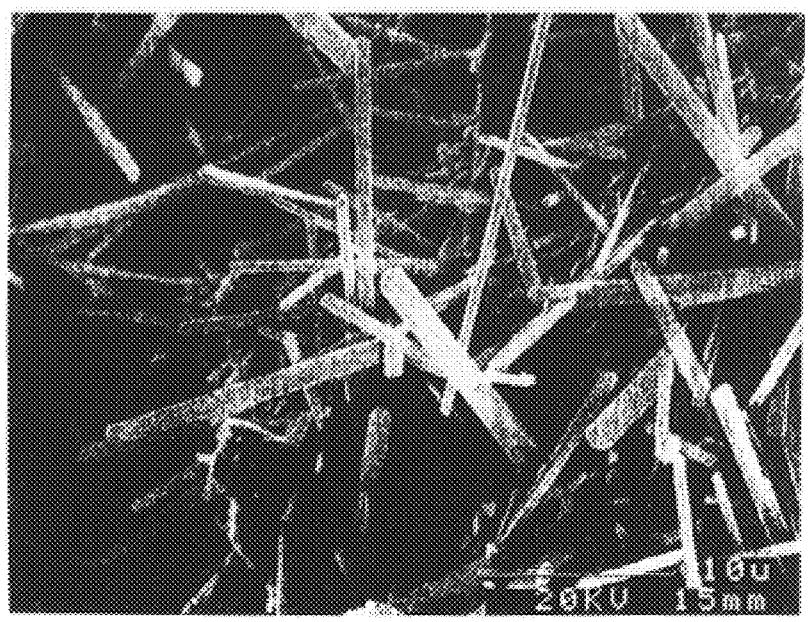
FIG. 7B x3,000 x600 x3,000

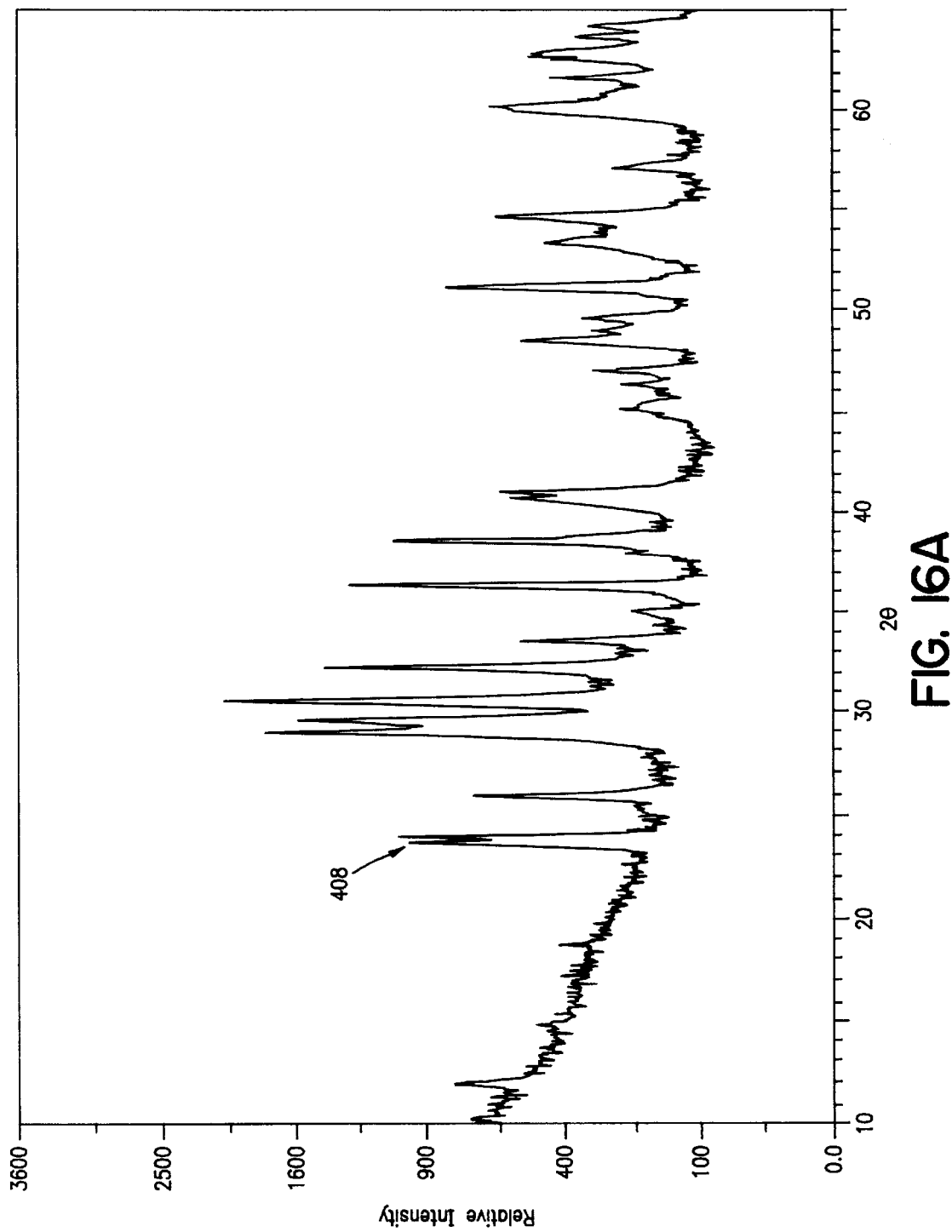

HEAT TREATED SILVER VANADIUM OXIDE FOR USE IN IMPLANTABLE MEDICAL DEVICES, ARTICLES AND METHODS

This application is a divisional of application Ser. No. 08/792,416, filed Feb. 3, 1997, now U.S. Pat. No. 5,955,218.

CROSS REFERENCE TO RELATED APPLICATIONS

This application claims priority from U.S. provisional application Ser. No. 60/034,649 entitled, "Improved Silver Vanadium Oxide Made by the Decomposition Method," filed Dec. 18, 1996, which is hereby incorporated herein by reference in its entirety.

FIELD OF THE INVENTION

The present invention relates to electrochemical cells and cathode material therein, and, in particular, to heat-treated silver vanadium oxide cathode material and methods of making same for use in implantable medical devices.

BACKGROUND

A plurality of electrochemical cells are connected together to form a battery. Silver-containing material is widely used as a cathode material in electrochemical cells. Silver-containing cathodes typically contain silver carbonate, silver thiocyanate, divalent silver oxide, silver bismuth oxide, copper silver vanadium oxide, and silver vanadium oxide. Some batteries, when using some of these compounds as the cathode material in individual electrochemical cells therein, however, do not exhibit ideal electrical properties. Ideal electrical properties include a low internal discharge rate (i.e., a low increase in internal resistance over the lifetime of the cell). A high internal discharge rate undesirably decreases the deliverable capacity (i.e., the integral of current times the discharge time) of a cell. Different cathode materials contribute to different problems. For example, silver chromate undesirably contributes to a large voltage drop during high loads. Divalent silver oxide is soluble and undesirably decomposes over time. These are just a few of the problems associated with some of the above-mentioned cathode materials.

Silver vanadium oxide (SVO) is utilized as a cathode material in lithium (Li) anode electrochemical cells (and, thus, batteries incorporating such electrochemical cells) due to its relatively high volumetric energy density (i.e., the product of capacity times average voltage divided by volume of material), which is particularly desirable for small batteries. The size of the battery is important in implantable medical devices, such as implantable cardiac defibrillators (such as that illustrated in FIG. 1), so that the device itself occupies a smaller volume within a patient's body and is lighter in weight.

Batteries utilized in implantable medical devices (e.g., defibrillators), however, must also be very reliable. Thus, it is important that such implantable batteries be able to deliver a pulsing current with a minimal voltage drop during the pulse. Typical pulsing requirements include pulses of about ten seconds in duration at an amplitude of about one to about three amperes. Thus, in order to have sufficient available voltage for providing the current pulses, it is important that batteries do not have a high time-dependent increase in internal resistance so that they can provide a long service life without needing frequent replacement.

Because a battery that does not exhibit an increase in internal resistance over the life of the battery is not yet possible, a battery that has a predictable life and provides signs of its chemical exhaustion before the end of its life is important, particularly for use in implantable medical devices. Signs of chemical exhaustion enable one attuned to such signs to change the battery before its failure time. SVO cathodes, when used in conjunction with Li anodes, provide an open circuit voltage curve with multiple voltage plateaus as a function of depth of discharge. Thus, electrochemical cells containing SVO cathodes and Li anodes are preferred for use in implantable batteries because the lifetime of such batteries can readily be detected from the position on and slope of the curve.

SVO is capable of being synthesized using a variety of methods. Methods of synthesis generally fall within two categories, depending on the type of chemical reaction that produces the SVO. SVO can be synthesized using a decomposition reaction, resulting in decomposition-produced SVO (DSVO). Decomposition reactions are known to utilize decomposable metal compounds, such as nitrates, nitrites, carbonates, and ammonium salts for the reacting metal components. A conventional DSVO reaction proceeds at a temperature of about 360° C. from silver nitrate and vanadium pentoxide according to the following reaction: $2AgNO_3 + 2V_2O_5 \rightarrow Ag_2V_4O_{11} + 2NO_x$. This process results in DSVO having a relatively low crystallinity and a capability to have a pressed pellet density of about 3.04 g/cm$^3$ (pressed under the conditions described herein).

Alternatively, SVO can be synthesized using a combination reaction, resulting in combination-produced SVO (CSVO). A conventional CSVO reaction proceeds at a temperature of about 500° C. from silver oxide and vanadium pentoxide according to the following reaction: $Ag_2O + 2V_2O_5 \rightarrow Ag_2V_4O_{11}$. The resulting CSVO is well crystallized and has a capability to have a pressed pellet density of about 3.53 g/cm$^3$, which is approximately fifteen-percent greater than the pressed pellet density of DSVO, using the same conditions for pressing the material.

Regardless of how it is made, SVO can be formed in a variety of different structural phases (e.g., β, γ, and ε). This is illustrated by the phase diagram for the formation of SVO from the decomposition reaction of $V_2O_5$ and $AgVO_3$ in prior art FIG. 2.

SVO cathode material, when used in conjunction with a Li anode in an electrochemical cell, exhibits varying open circuit voltage characteristics, depending on the amount of Li incorporated into the cathode. As is illustrated in prior art FIG. 3, when used in conjunction with SVO having a formula of $Ag_2V_{4l}O_{11}$, the amount of Li, x, incorporated into the cathode dictates the open circuit voltage of the electrochemical cell. The graph of open circuit voltage versus the amount of Li, x, incorporated into the cathode illustrates a characteristic dual voltage plateau for such electrochemical cells and batteries. The open circuit voltage is fairly constant at portion 80 of the graph, when x is about 0 to about 2, and at portion 82, when x is about 3 to about 5.2. The open circuit voltages at these two portions 80 and 82 have respective values of about 3.2 V and about 2.6 V. A problem experienced by many $LixAg_2V_4O_{11}$ electrochemical cells, however, is a time-dependent increase in internal resistance with increasing amounts of lithium, x, in the cathode composition of $LixAg_2V_4O_{11}$, starting just to the left of the second voltage plateau (i.e., portion 82) of FIG. 3 and continuing the remainder of the discharge time.

To test the behavior of an electrochemical cell containing a particular SVO composition upon discharge over a long period of time, especially the time-dependency starting just prior to the second voltage plateau, long-term discharge tests are run. The results of a long-term discharge test for an electrochemical cell containing a conventional, as-synthesized (i.e., material that has not been processed after its initial formation) DSVO cathode material are illustrated in prior art FIG. 3. In long-term discharge tests, conventional Li/DSVO electrochemical cells display a time-dependent increase in internal resistance when the amount of Li, x, in $Li_xAg_2V_4O_{11}$ is about 2.3 to about 6.7. Curve 84 in FIG. 3 corresponds to an accelerated test on the order of magnitude of a few days. Curve 86 corresponds to one more year than curve 84. Curve 88 corresponds to three more years than curve 84. Curve 90 corresponds to five more years than curve 84. The internal resistance values of the four curves increase with increasing time. This increase in internal resistance potentially significantly shortens the lifetime of devices in which it is used.

As stated above, it has been shown that discharge characteristics of a Li/CSVO electrochemical cell are more desirable than the discharge characteristics of a conventional Li/DSVO electrochemical cell. This is particularly due to Li/DSVO's time-dependent increase in internal resistance beginning slightly before the second voltage plateau of a discharge curve. Thus, attempts have been made at improving the electronic properties of DSVO cathode material for use in electrochemical cells and batteries.

For example, attempts have been made to increase the synthesis temperature of DSVO, so that it more closely resembles the higher synthesis temperature of CSVO. U.S. Pat. No. 5,545,497 (Takeuchi et al.) discloses a method of synthesizing DSVO by reacting vanadium pentoxide and silver nitrate at temperatures of 350° C. to 550° C. The resulting DSVO has a formula of $Ag_xV_2O_y$, wherein 0.33<x<0.99 and 5.16<y<5.49.

DSVO cathodes with optimal characteristics have been reported to have been synthesized in air at 450° C. R. A. Leising et al., (*Chem. of Materials*, 5, 738–42 (1993)). This DSVO has the formula $AgV_2O_{5.5}$ and needle-like crystallites. The DSVO crystallites are reported to have a typical crystallite diameter of less than one micron and a length of 10 to 20 microns. However, the capacity (i.e., integral of current times the discharge time) results for electrochemical cells containing DSVO synthesized at 450° C. indicated little difference from capacity results for electrochemical cells containing DSVO synthesized at 320° C. to 375° C., as shown in Table V of Leising et al.

Furthermore, Leising et al. reported that the DSVO synthesized at 450° C. had a similar degree of crystallinity as compared to the DSVO synthesized at 320° C./375° C., utilizing x-ray diffraction (XRD) analysis for that conclusion. Also, Leising et al. reported that when DSVO was synthesized in air at 540° C., the resulting material contained a mixture of different crystallographic phases (e.g., 10×40 micron crystallites mixed with irregular particles), and the XRD data indicated the presence of a new phase having a formula of $Ag_{1.2}V_3O_8$ (-phase)). Testing of this DSVO material in electrochemical cells resulted in an undesirably significant decrease in delivered capacity. Thus, according to Leising et al., increasing the temperature at which the DSVO is synthesized does not improve the electrochemical performance of the DSVO when used as a cathode material.

Thus, there is a need for improved SVO cathode electrochemical cells with decreased time-dependent internal resistance beginning slightly before the second voltage plateau. There is a further need for improved SVO cathode electrochemical cells with increased power and capacity.

Table 1 below lists documents that disclose information of interest to methods of preparation of silver vanadium oxide (SVO) and electrochemical cells containing SVO cathodes, as well as electrochemical cells in general.

TABLE 1

| Patent No. | Inventor(s) | Issue Date |
|---|---|---|
| 4,016,338 | Lauck | 5 April 1977 |
| 4,158,722 | Lauck et al. | 19 June 1979 |
| 4,310,609 | Liang et al. | 12 Jan. 1982 |
| 4,391,729 | Liang et al. | 5 July 1983 |
| 4,542,083 | Cava et al. | 17 Sept. 1985 |
| 4,675,260 | Sakurai et al. | 23 June 1987 |
| 4,751,157 | Uchiyama et al. | 14 June 1988 |
| 4,751,158 | Uchiyama et al. | 14 June 1988 |
| 4,803,137 | Miyazaki et al. | 7 Feb. 1989 |
| 4,830,940 | Keister et al. | 16 May 1989 |
| 4,964,877 | Keister et al. | 23 Oct. 1990 |
| 4,965,151 | Takeda et al. | 23 Oct. 1990 |
| 5,194,342 | Bito et al. | 16 March 1993 |
| 5,221,453 | Crespi | 22 June 1993 |
| 5,298,349 | Takeuchi | 29 March 1994 |
| 5,389,472 | Takeuchi et al. | 14 Feb. 1995 |
| 5,545,497 | Takeuchi et al. | 13 Aug. 1996 |
| 5,458,997 | Crespi et al. | 17 Oct. 1995 |
| 5,472,810 | Takeuchi et al. | 5 Dec. 1995 |
| 5,498,494 | Takeuchi et al. | 12 March 1996 |
| 5,498,495 | Takeda et al. | 12 March 1996 |
| 5,512,214 | Koksbang | 30 April 1996 |
| 5,516,340 | Takeuchi et al. | 14 May 1996 |
| 5,558,680 | Takeuchi et al. | 24 Sept. 1996 |
| 5,567,538 | Oltman et al. | 22 Oct. 1996 |

Leising et al., Chem. of Materials, 5, 738–42 (1993)
Zandbergen et al., Journal of Solid State Chemistry, 110, 167–175 (1994)

All documents listed in Table 1 above are hereby incorporated by reference herein in their respective entireties. As those of ordinary skill in the art will appreciate readily upon reading the Summary of the Invention, Detailed Description of the Preferred Embodiments, and Claims set forth below, many of the devices and methods disclosed in the documents in Table 1 may be modified advantageously by using the teachings of the present invention.

SUMMARY OF THE INVENTION

The present invention has certain objects. That is, various embodiments of the present invention provide solutions to one or more problems existing in the prior art with respect to implantable medical devices and the batteries used therein. These problems are set forth above. Various embodiments of the present invention have the object of solving at least one of the problems discussed above. Therefore, it is an object of the present invention to provide heat-treated SVO material for use in the cathodes of electrochemical cells, particularly for use in implantable medical devices, with decreased time-dependent internal resistance beginning slightly before the second voltage plateau, when compared to the same SVO material prior to heat treatment. It is a further object of the present invention to provide heat-treated SVO material for use in the cathodes of electrochemical cells, particularly for use in implantable medical devices, with increased power and capacity, when compared to the same SVO material prior to heat treatment.

To meet one or more of these objects, the present invention provides heat-treated silver vanadium oxide capable of being pressed into a pellet having a pressed pellet density of about 3.10 $g/cm^3$ to about 3.45 $g/cm^3$ when about 2 grams of the heat-treated silver vanadium oxide are uniaxially pressed into a pellet using a 1.6 cm diameter cylindrical die with a 7,500 pound force applied for 5 seconds. This material can be used in a cathode with a binder, which can be incorporated into an electrolytic cell. The electrolytic cell can be used alone as a single-cell battery or in combination with other electrolytic cells in a multi-cell battery. The battery is preferably used in an implantable medical device, although the battery can be used to power other devices as well.

BRIEF DESCRIPTION OF THE DRAWINGS

FIGS. 7A and 7B are scanning electron micrographs at respective magnifications of 600× and 3,000×, illustrating DSVO heat-treated at 500° C. for 2 hours under $O_2$ flow.

FIG. 16A is an XRD scan (Cu Kα radiation) of heat-treated DSVO in accordance with the present invention, wherein as-synthesized DSVO of FIGS. 13A and 13B was heat-treated at 500° C. for 2 hours under $O_2$ flow.

DETAILED DESCRIPTION OF THE PREFERRED EMBODIMENTS

Figure 1:
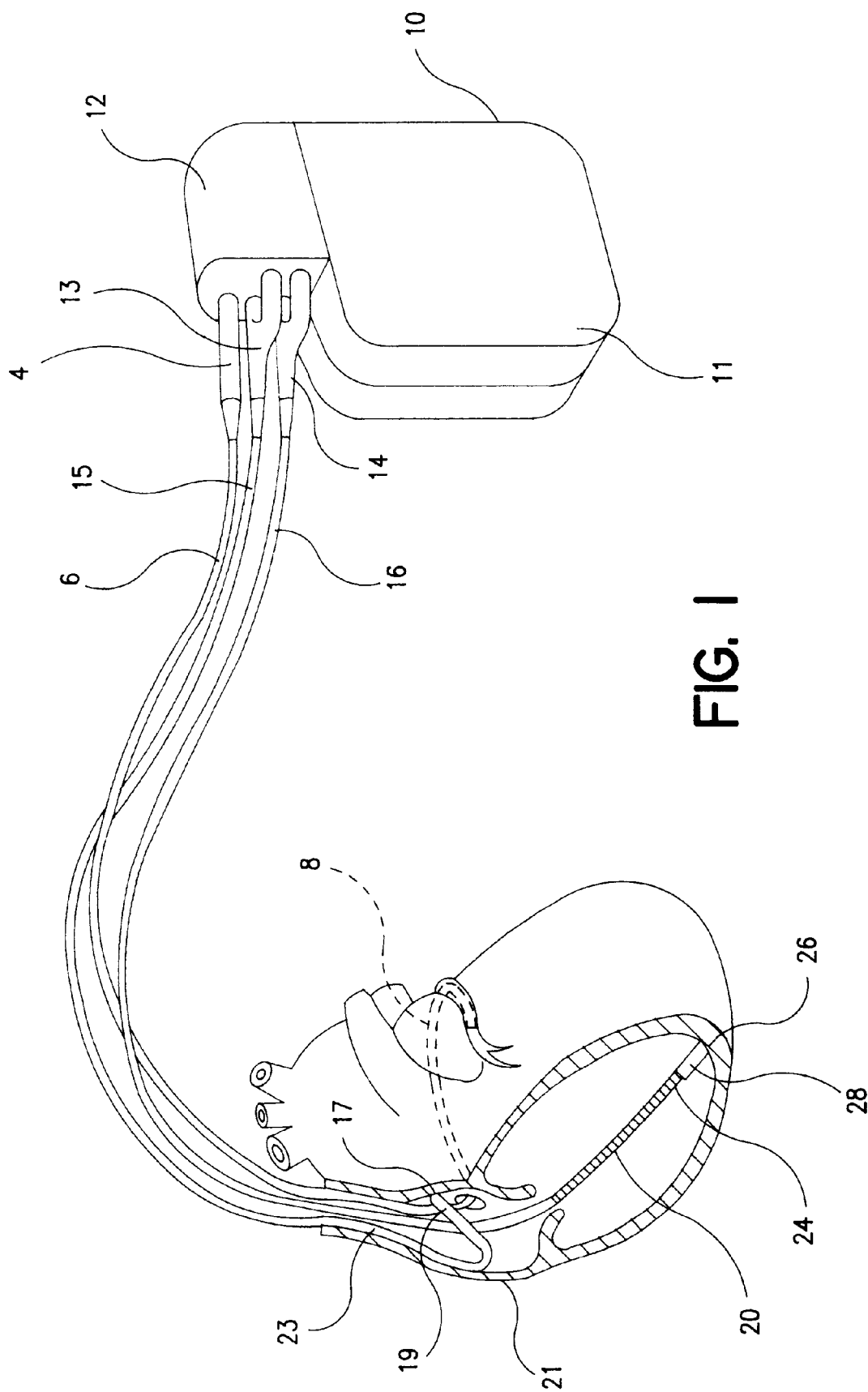
FIG. 1 is a schematic representation of an implantable battery, utilized in an implantable cardiac defibrillator.

An improved silver vanadium oxide (SVO) material is prepared according to the present invention by heat treating as-synthesized (i.e., material that has not been processed after its initial formation) SVO material. Preferably, the SVO material is decomposition-produced SVO (DSVO). However, other types of as-synthesized SVO can also be heat-treated in accordance with the present invention, preferably including SVO having a ratio of vanadium to oxide of about 2:1 or greater. For example, SVO having the following formulas, β-phase SVO (e.g., $AgV_{5.25}O_{13.6}$), γ-phase SVO (e.g., $Ag_{1.2}V_3O_8$), δ-phase SVO (e.g., $Ag_{0.68}V_2O_5$), and ε-phase SVO (e.g., $AgV_2O_{5.58}$) can be heat-treated in accordance with the present invention.

It is preferable that heat-treated SVO produced in accordance with the present invention has the formula $Ag_xV_4O_y$, wherein x is about 1.6 to about 2.2 and y is about 10.5 to about 11.5. More preferably, x is about 2 and y is about 11. Most preferably, the heat-treated SVO produced has the formula $Ag_2V_4O_{11}$.

Any method of preparation, including decomposition and combination reactions, can be used to form as-synthesized SVO, which can then be heat treated in accordance with the present invention. This includes CSVO prepared according to the method of U.S. Pat. No. 5,221,453 (Crespi), particularly CSVO synthesized at lower temperatures. In one embodiment, DSVO is synthesized by reacting a decomposable silver-containing compound and a vanadium-containing compound. The decomposable silver-containing compound can be, for example, $AgNO_3$, $AgNO_2$, $Ag_2O_2$, $Ag_2CO_3$, or $Ag(CH_3CO_2)$. The vanadium-containing compound can be, for example, $NH_4VO_3$, $AgVO_3$, $V_2O_5$, $V_2O_4$, $V_6O_{13}$, or $V_2O_3$. Mixtures of silver-containing compounds and vanadium-containing compounds can be used as well. In one embodiment, DSVO is synthesized using $AgNO_3$ and $V_{2}O_5$. For example, U.S. Pat. No. 4,391,729 (Liang et al.) describes one such method for the synthesis of DSVO. The method of Liang et al. uses a synthesis temperature of 380° C. Other methods of preparing SVO include, for example, a sol-gel method (e.g., a sol-gel method as described in U.S. Pat. No. 5,558,680 to Takeuchi et al.), a hydrothermal method (e.g., synthesis in an aqueous environment under elevated pressure), and a method of preparing amorphous materials with additives (e.g., a method as described in U.S. Pat. No. 5,498,494 to Takeuchi et al.).

It is desirable to utilize a low synthesis temperature, as is possible for decomposition reactions, as opposed to combination reactions, so that resulting particles are smaller in size. Smaller sized particles allow higher power electrochemical cells to be produced, using the SVO material as the cathode. Thus, it is desirable to increase the crystallinity of as-synthesized SVO, particularly DSVO, to more closely resemble that of as-synthesized CSVO as described in U.S. Pat. No. 5,221,453 (Crespi), while still maintaining the ability to synthesize the SVO at relatively low temperatures.

In accordance with the present invention as-synthesized SVO is heat-treated in a conventional processing chamber. The as-synthesized SVO may be in the form of non-compressed particles (i.e., those particles not pressed together at a pressure of about 0.54 kg/m$^2$ or more, as in a conventional process utilized to fabricate hard pellets for conductivity measurements or cathode material), and includes loose (i.e., free-flowing) particles, or even compressed pellets (i.e., wherein particles are pressed together at a pressure of about 0.54 kg/m$^2$ or more). Preferably, the as-synthesized SVO is in the form of non-compressed particles, and more preferably generally loose (i.e., generally free flowing) particles (which may include agglomerates of individual particles). A Lindberg GS tube furnace, manufactured by the Lindberg Co. of the United Kingdom, is one suitable processing chamber in which to practice the method of the invention.

Heat-treating, as used herein, includes heating SVO that has not been processed after its initial synthesis (i.e., as-synthesized SVO). For example, heat-treating SVO includes synthesizing CSVO at low temperatures and then heat treating the as-synthesized CSVO. Heat-treating SVO also includes synthesizing DSVO and then heat treating the as-synthesized DSVO. Heat-treating, as used herein, preferably does not include heating particles of SVO while simultaneously, or previously, applying pressures of 0.54 kg/m$^2$ or more to the particles, but can include heating particles of SVO while simultaneously, or previously, applying pressures of less than 0.54 kg m$^2$ to the particles.

The conditions for heat treating SVO in accordance with the invention include varying the heat treatment temperature and the heat treatment duration. The heat treatment temperature of the as-synthesized SVO is preferably at least about 390° C., and preferably no greater than about 580° C. At temperatures above about 580° C., the resultant material can contain material having a lower capacity than if heat-treated at lower temperatures. Thus, material can be improved at temperatures above about 580° C., but may not be as desirable for use in electrochemical cells. The heat treatment duration is preferably about 0.5 hour or longer. More preferably, the heat treatment temperature is about 430° C. to about 560° C. and the heat treatment duration is about 1 hour to about 24 hours. Most preferably, the heat treatment temperature is about 460° C. to about 550° C. and the heat treatment duration is about 1 hour to about 12 hours.

Figure 4:
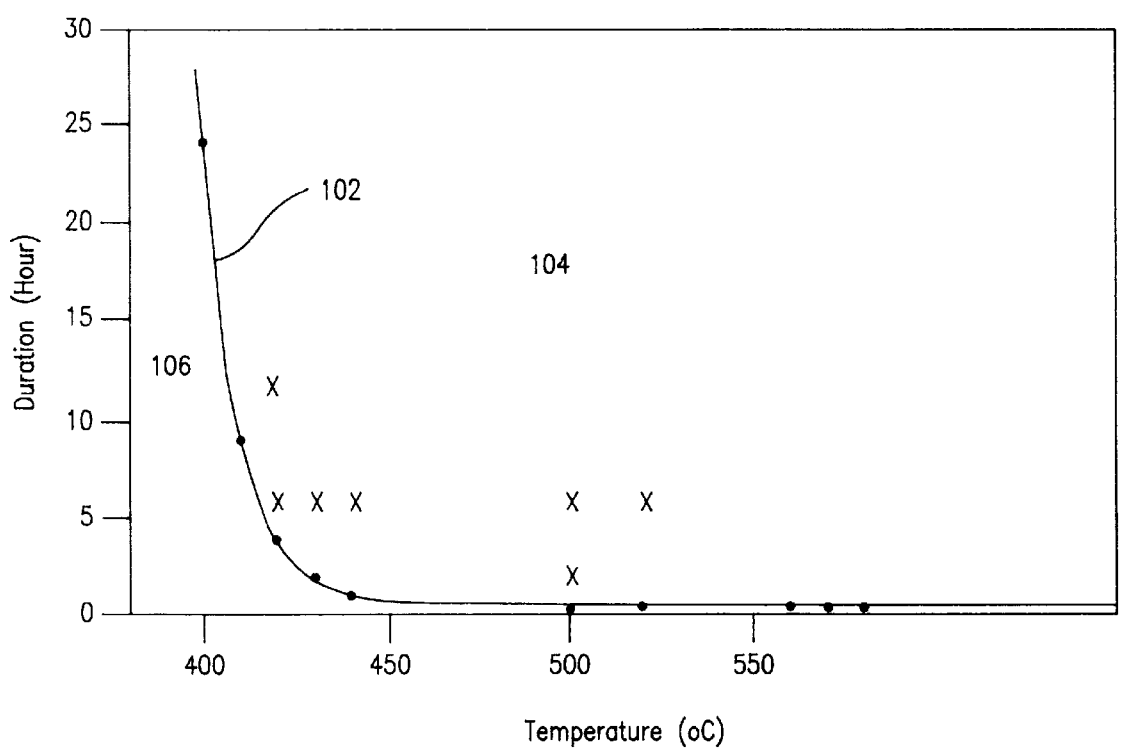
FIG. 4 is a graphical representation of heat treatment duration versus heat treatment temperature in accordance with the present invention, used to produce improved DSVO.

In general, higher heat treatment temperatures require shorter durations and lower heat treatment temperatures require longer durations. As illustrated in FIG. 4, under certain conditions a combination of temperature and duration falling on and to the right of line 102 in region 104 leads to particularly favorable results. By this, it is meant that {002} and {201} peaks between about 23° (2θ) and about 25° (2θ) in an x-ray diffraction (XRD) scan are resolved into two distinct peaks, as will be described further below.

Herein, the terms "crystalline" and "crystallized" refer to a structure having properties resembling those of a crystal. A crystal is a solid body bounded by natural plane faces that are the external expression of a regular internal arrangement of constituent atoms. The atoms in a crystal occupy positions with definite geometrical relationships to each other, forming a kind of scaffolding called a crystalline lattice. The purpose of the heat treatment in accordance with the present invention is to increase the degree of crystallinity of as-synthesized SVO, as can be seen by the increased number of crystallites in heat-treated SVO prepared according to the present invention. By heat treating non-compressed particles, the degree of crystallinity of the as-synthesized SVO can increase, as is desirable in order to decrease the rate at which internal resistance increases over discharge time, particularly in conventional DSVO electrochemical cells.

As further illustrated in FIG. 4, using heat treating conditions falling within region 106 is typically not as favorable as using heat treating conditions falling within region 104. It should be noted that line 102 is not critically defined. However, for line 102 illustrated in FIG. 4, the following equation defines the line: $y=a+b/[1+(x/c)^d]$, wherein a is about 0.5407, b is about 656.28, c is about 369.14, and d is about 41.06. "TABLECURVE" Software manufactured by Jandel Scientific, Chicago, Ill., was used to obtain the equation for line 102. Actual experimental data is illustrated by "X" marks on FIG. 4. Based upon processing equipment used and other variables, actual experimental data can vary, however, from that illustrated in FIG. 4.

When using heat treatment conditions of the present invention, heat treatments can occur at higher temperatures for longer durations, increasing the stability and crystallinity of the resulting material. The heat treatment temperature and duration can be used to tailor the resulting crystallite size as desired. For example, when higher temperatures are used for the heat treatment, the resulting crystallites are relatively longer and wider in comparison to crystallites formed from heat treating at lower temperatures, which are shorter and thinner. Similarly, when shorter durations are used for the heat treatment, the resulting crystallites are relatively short and thin as compared to crystallites formed from heat treating at longer durations, which are longer and wider. Crystallites having intermediate crystallographic characteristics can also be obtained using the method of the invention.

In a preferred embodiment, simultaneously with the heat treatment, a gas flow is directed over the as-synthesized SVO material. The type of flowing gas used during processing preferably includes, for example, oxygen ($O_2$), nitrogen ($N_2$), argon (Ar), atmospheric air, or mixtures thereof. The gas flow and/or processing chamber can be under ambient pressure, elevated pressure, or reduced pressure. It is thought that the use of an oxidizing gas results in a more highly oxidized material, which can deliver more capacity in an electrochemical cell. Thus, preferably, the type of gas flow used during processing includes an oxidizing gas, such as $O_2$, which can preferably be used in combination with an inert gas (i.e., a gas that is unreactive under the processing conditions described herein), such as $N_2$ or Ar. Most preferably, the type of gas flow used during processing is an oxidizing gas, having an $O_2$ content (i.e., partial pressure) greater than that found in air. The gas flow rate is not critical to producing the desired product of the invention, a gas flow rate of preferably at least about 40 mL/minute, and more preferably about 100 minute, is used. It is also to be understood, however, that the heat treatment can occur in the presence of a stagnant (i.e., having no active gas flow) gas, such as stagnant air. Thus, a separate flow of gas is not necessary for the practice of this invention.

In yet a further embodiment, before the as-synthesized SVO is heat-treated, it can be ground (i.e., broken into smaller particles) to provide a smaller as-synthesized SVO particle size, if desired. By grinding the as-synthesized SVO into smaller particles, a more homogenous resulting SVO material is obtained after the heat treatment. After the as-synthesized SVO is heat treated in accordance with the present invention, the SVO can also be ground to provide smaller particles. Any conventional method for breaking materials into loose particles can be used to grind the materials. For example, material can be broken into loose particles using a mortar and pestle.

Many different methods can be used for characterizing the improved SVO of the present invention. The methods, some of which are described below and utilized in the following examples, illustrate that SVO heat treated in accordance with the present invention contains a plurality of needle-like crystallites.

Figure 2:
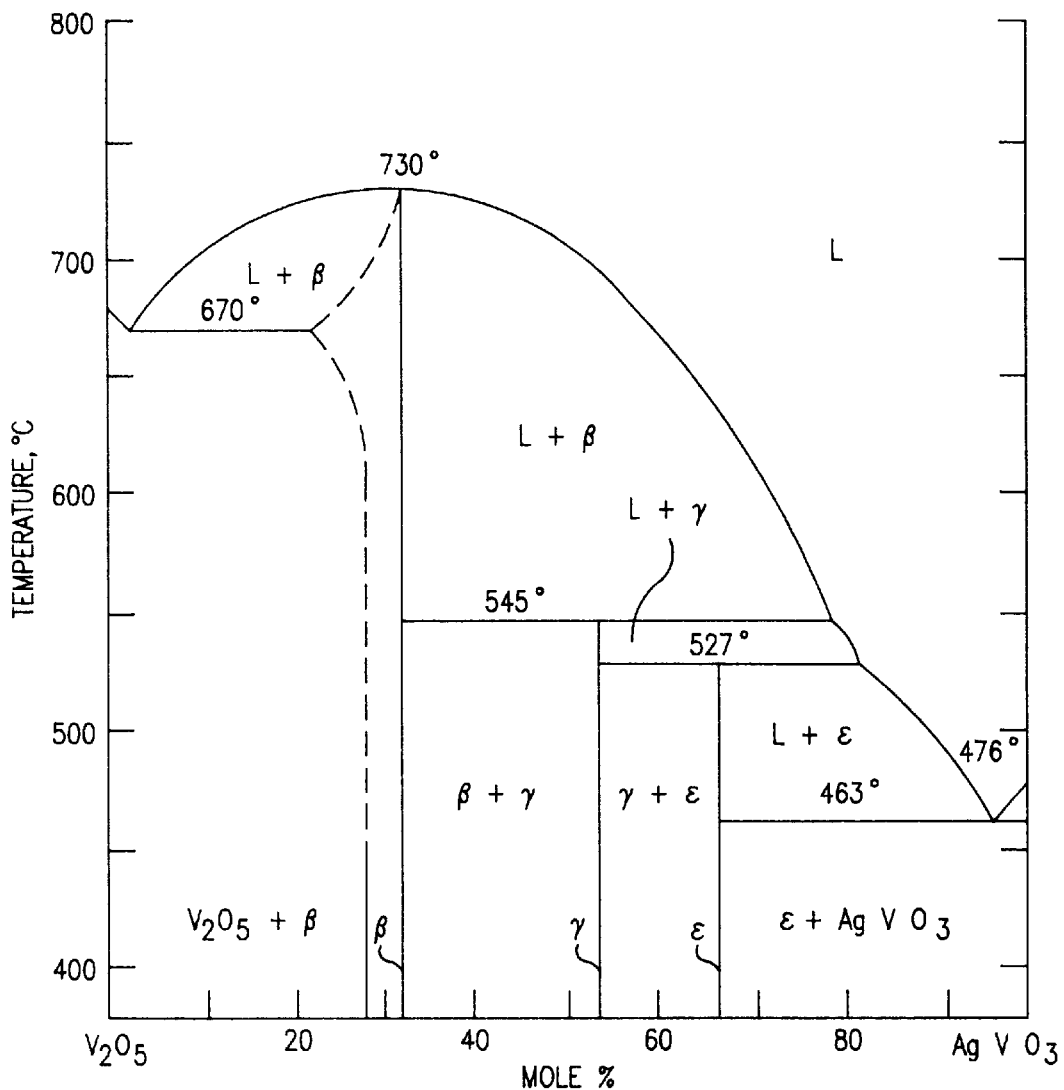
FIG. 2 is a prior art phase diagram for a $V_2O_5$ and $AgVO_3$ system.
Figure 3:
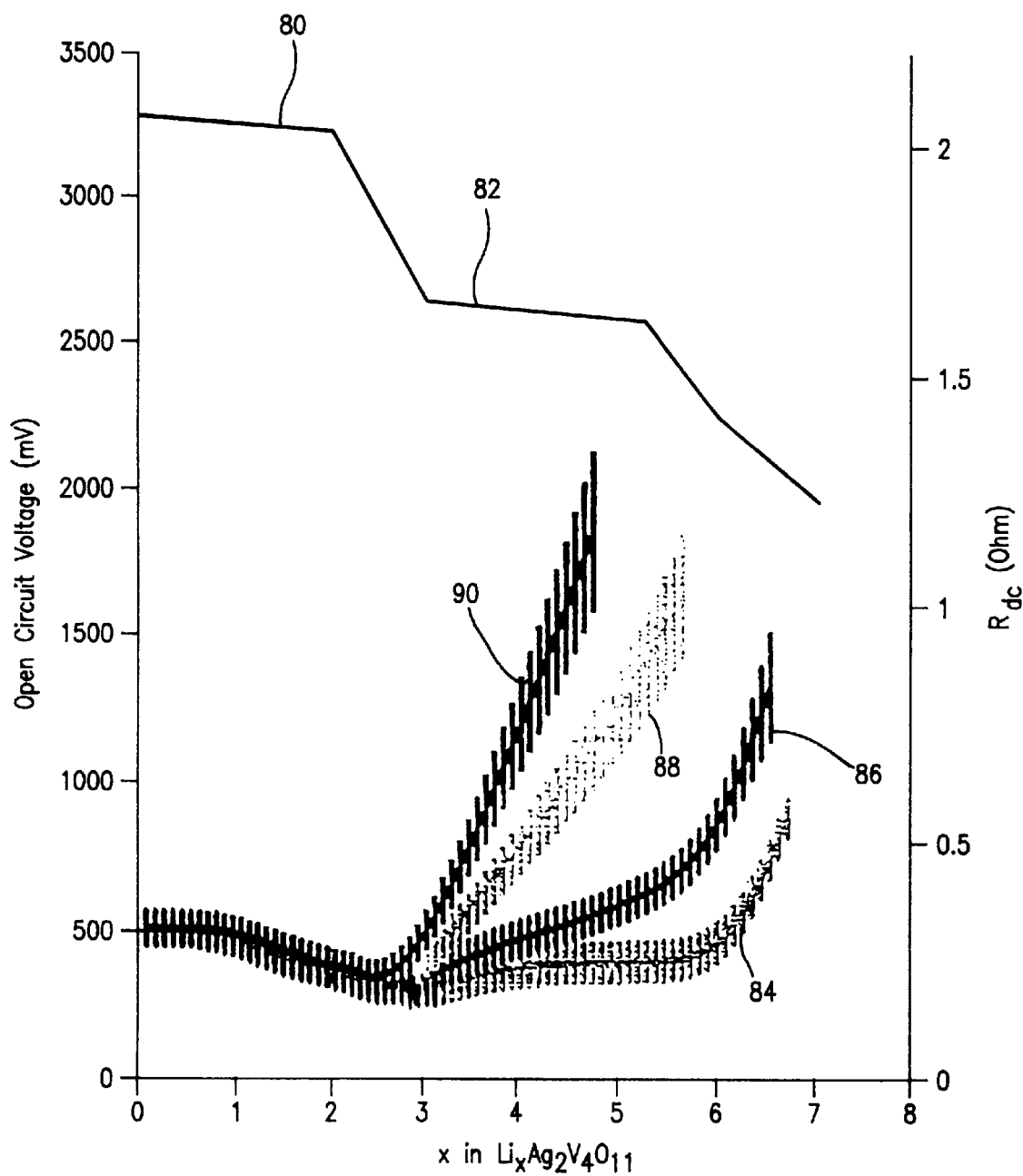
FIG. 3 is a prior art graphical representation of open circuit voltage versus x in the formula, $Li_xAg_2V_4O_{11}$ for an electrochemical cell containing an as-synthesized DSVO cathode, collected at a variety of discharge times.
Figure 5A:
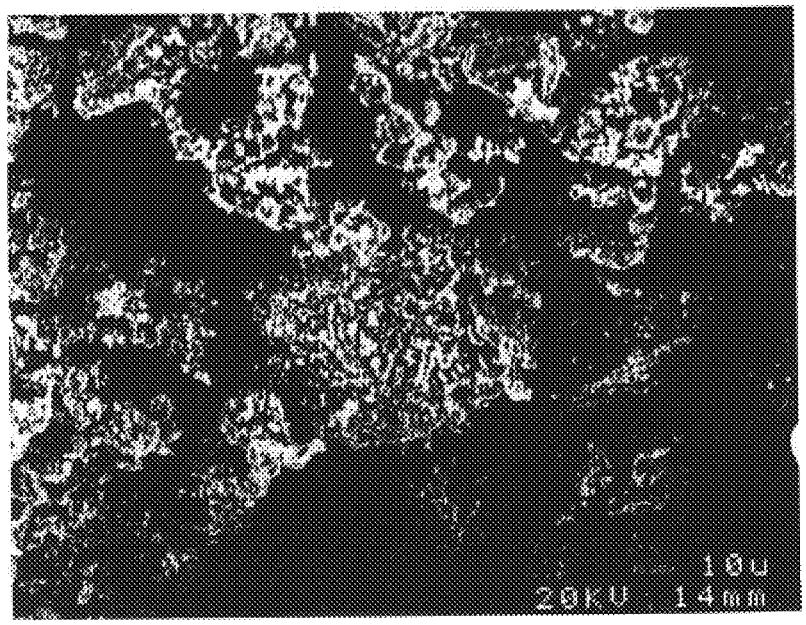
FIGS. 5A and 5B are scanning electron micrographs at respective magnifications of 600× and 3,000×, illustrating as-synthesized DSVO.
Figure 5B:
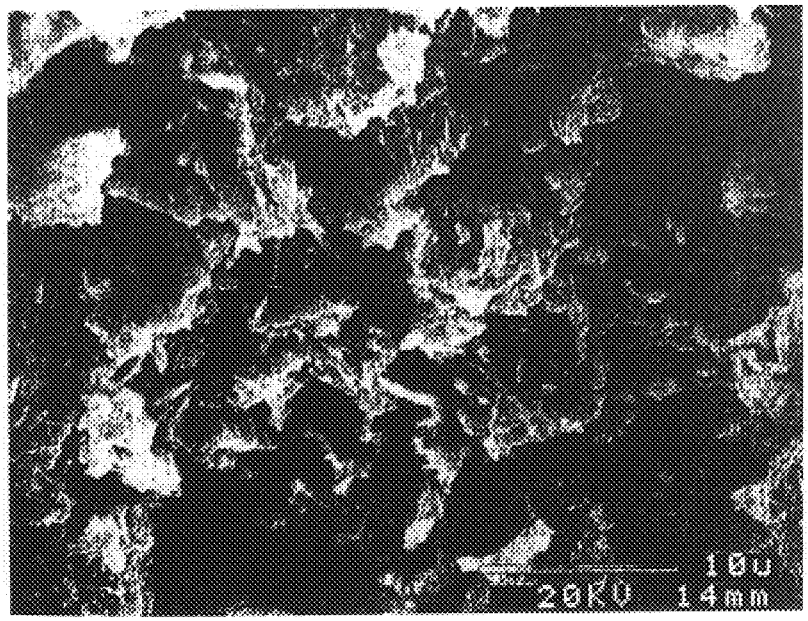
Figure 6A:
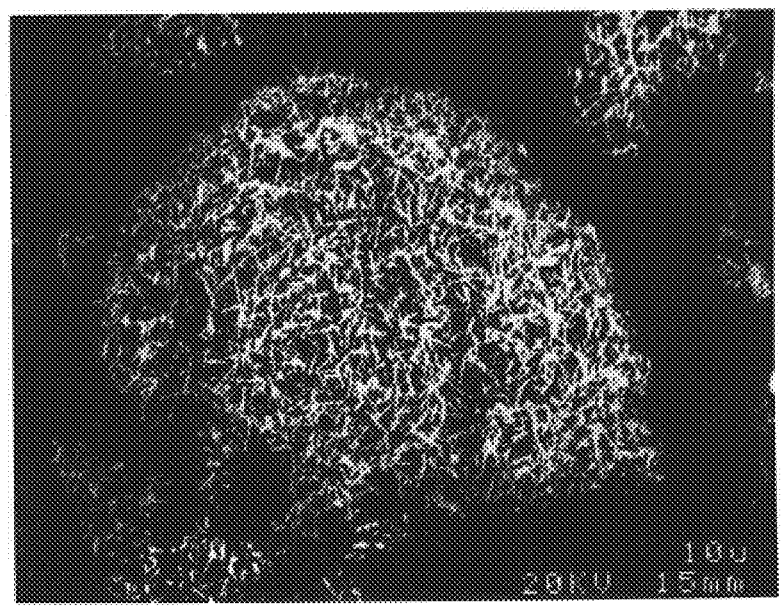
FIGS. 6A and 6B are scanning electron micrographs at respective magnifications of 600× and 3,000×, illustrating DSVO heat-treated at 440° C. for 6 hours under $O_2$ flow.
Figure 6B:
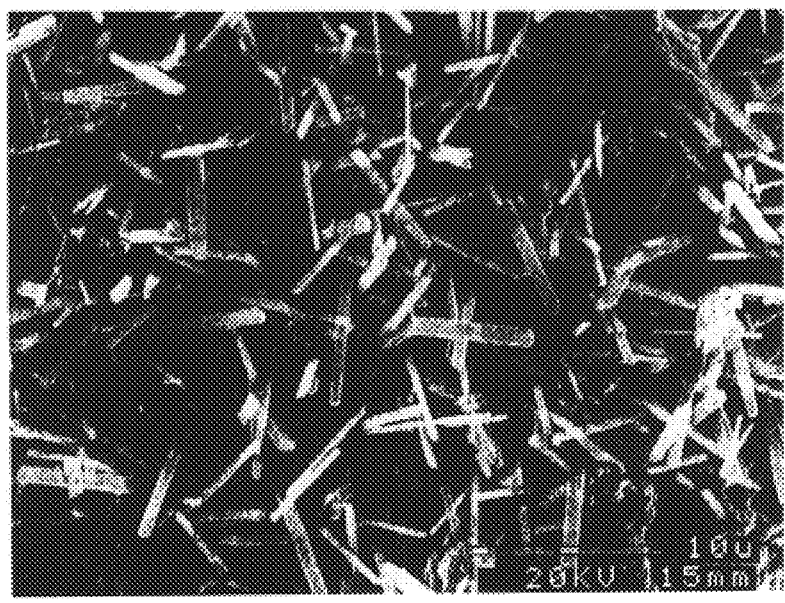
Figure 8A:
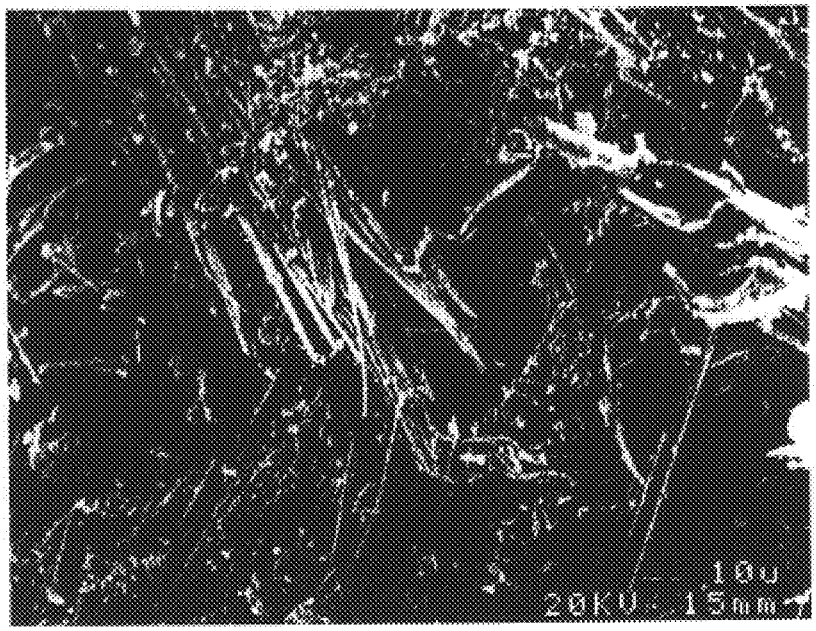
FIGS. 8A and 8B are scanning electron micrographs at respective magnifications of 600× and 3,000×, illustrating DSVO heat-treated at 540° C. for 0.5 hour under $O_2$ flow.
Figure 8B:
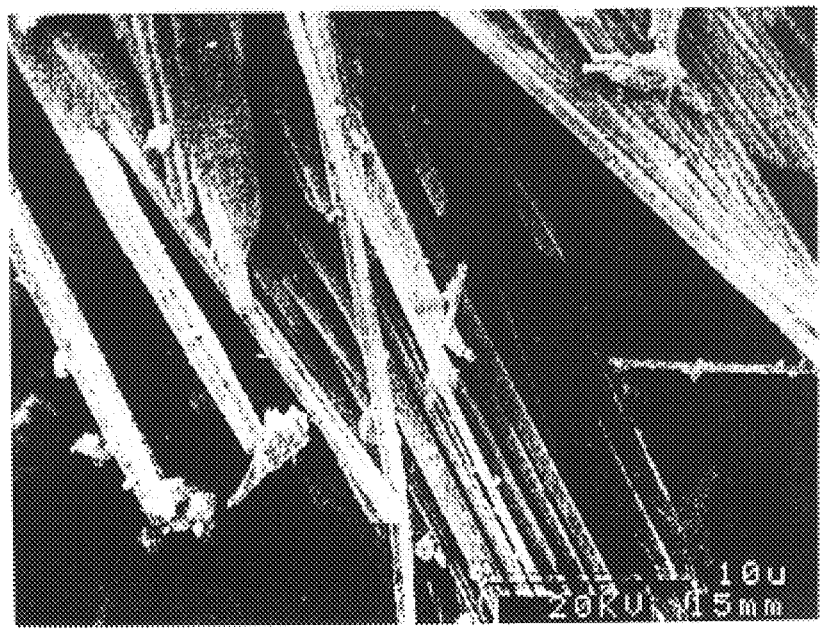

Heat treating DSVO increases the crystallinity of the resulting material, as compared to as-synthesized DSVO, which has a relatively lumpy topography without many crystallites therein. Visual observations using scanning electron micrographs obtained with a JEOL JSM6301 FXV microscope confirmed this aspect of the invention. Scanning electron microscopy (SEM) is one method for analyzing the improved SVO. FIGS. 5A and 5B are SEMs at respective magnifications of 600× and 3,000×, illustrating as-synthesized DSVO. FIGS. 6A and 6B are SEMs at respective magnifications of 600× and 3,000×, illustrating DSVO heat-treated at 440° C. for 6 hours under $O_2$ flow. FIGS. 7A and 7B are SEMs at respective magnifications of 600× and 3,000×, illustrating DSVO heat-treated at 500° C. for 2 hours under $O_2$ flow. FIGS. 8A and 8B are SEMs at respective magnifications of 600× and 3,000×, illustrating DSVO heat-treated at 540° C. for 0.5 hour under $O_2$ flow. As compared to FIG. 2(*d*) in Leising et al., wherein the SEMs were taken at a magnification of 1,000×, it can be seen that the improved SVO of the present invention has more needle-like crystallites than that of Leising et al. Specifically, the material in FIG. 2(*d*) of Leising et al. was synthesized at 540° C. The material in the present FIGS. 8A and 8B were heat-treated at 540° C. Thus, by comparing the two SEMs, and further comparing the as-synthesized DSVO SEMs of FIGS. 5A and 5B, it can be seen that heat treating after synthesis results in a remarkably different material having a high degree of crystallinity. Furthermore, increasing the temperature can produce crystallites of larger size (e.g., longer and/or larger in diameter). Preferred crystallite sizes are typically obtained when as-synthesized DSVO is heat-treated at 500° C. for 2 hours in a flow of $O_2$, as illustrated in FIGS. 7A and 7B.

Significantly, the present invention provides for a controllable crystallite size, as represented by sieve fractions. As described below, sieve fraction refers to the weight of particles that fit through a sieve used for particle size analysis. Sieve fractions may correspond to one crystallite or a cluster (i.e., agglomerate) of crystallites, so this analysis does not necessarily represent actual crystallite size, but it is a good predictor of such sizes. In general, as the heat treatment duration increases, more large crystallites, are present in the heat-treated SVO material. This can be seen by referring to FIGS. 9–12. When longer, wider crystallites are desired, SVO is heat-treated at a higher temperature or for a longer duration. When shorter, thinner crystallites are desired, SVO is heat-treated at a lower temperature or for a shorter duration.

XRD measurements are another way of characterizing the resulting SVO material. Using Bragg's law, $n\lambda = 2d_{hkl}\sin\theta$, the size and shape of a unit cell can be determined from the XRD data. In Bragg's law, the wavelength of an incident beam is represented as $\lambda$ and n is a constant, corresponding to an integral number of $\lambda$s. The angle of incidence of an incident beam on a substrate is represented as $\theta$. The distance between crystallographic planes is represented as $d_{hkl}$. The distance between crystallographic planes, hkl, corresponds to the lattice parameter of a material (i.e., the spacing between adjacent atoms within a crystallographic plane defined by the parameters, hkl). Depending on the crystallographic structure of a material, not every incident beam will be reflected, as neighboring diffracted rays can cancel each other out. The angle of incidence can be varied to determine the distance between crystallographic planes, $d_{hkl}$. Furthermore, by analyzing the intensity of diffracted beams, it can be determined how two or more atoms are distributed at each lattice point.

Figure 13A:
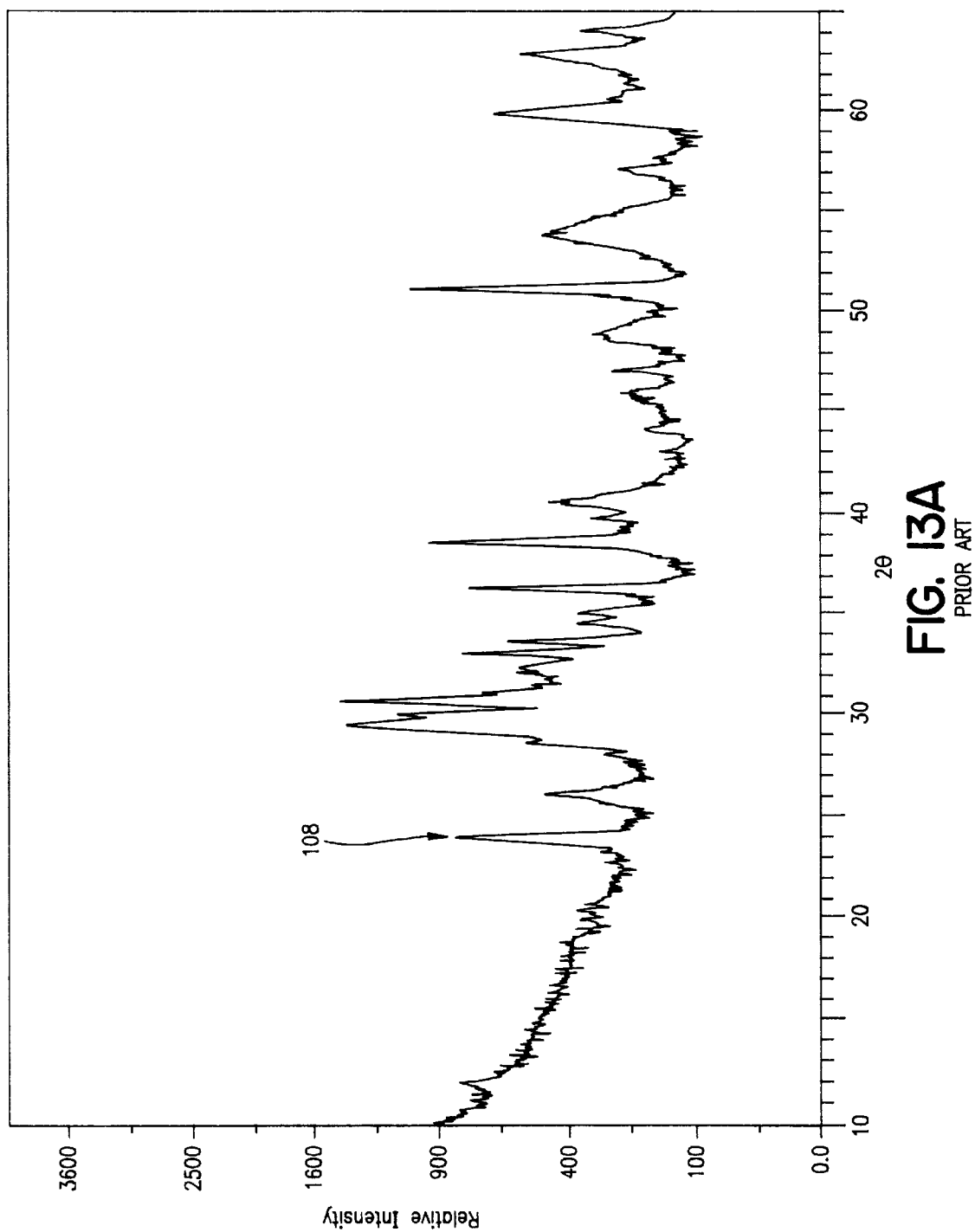
FIG. 13A is a prior art XRD scan (Cu Kα radiation) of as-synthesized DSVO made according to Example No. 1 of U.S. Pat. No. 4,391,729 (Liang et al.), with the exception that vanadium pentoxide was not synthesized as part of the experiment, but instead obtained from the Cerec Company of Milwaukee, Wis.
Figure 13B:
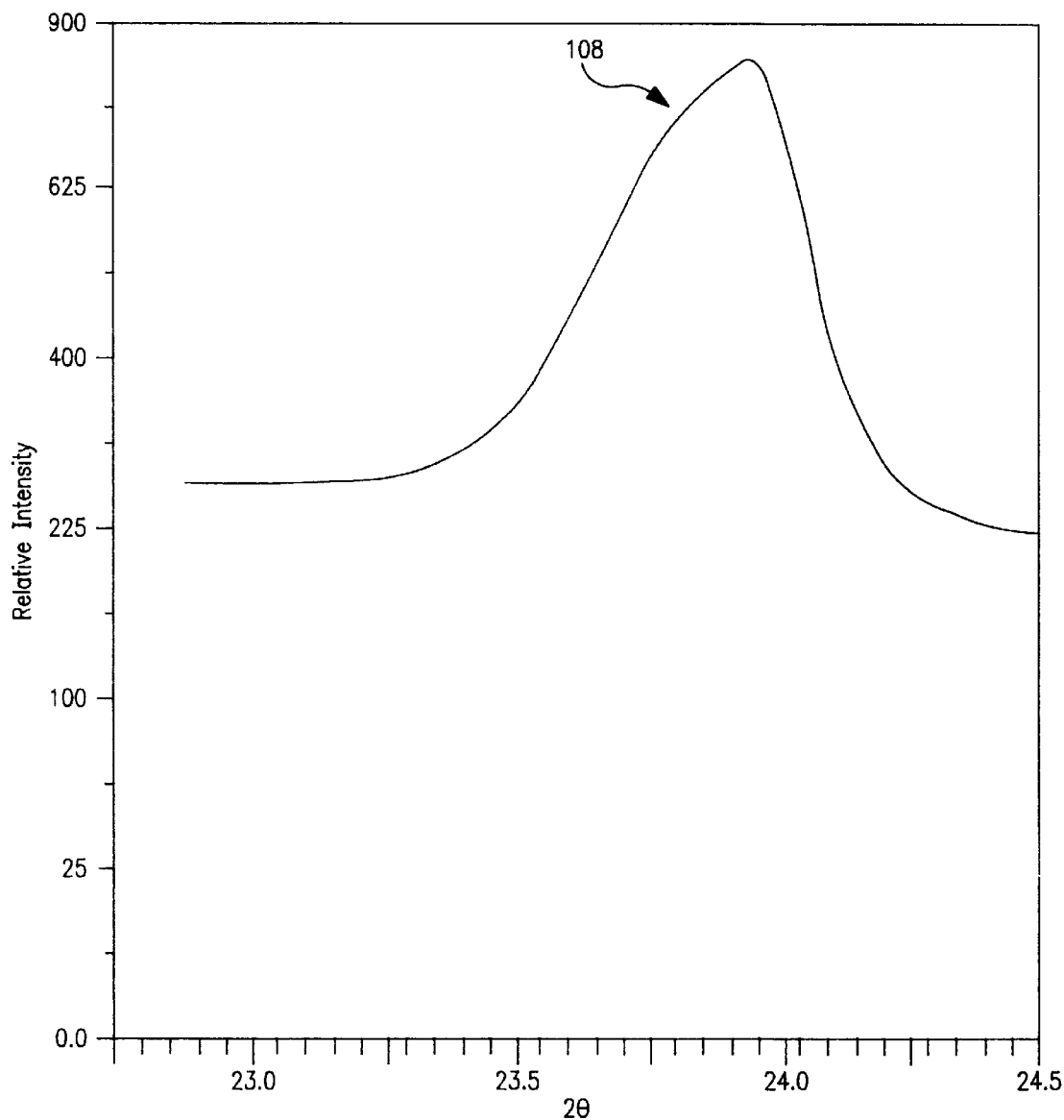
FIG. 13B is an exploded view of the prior art XRD scan of FIG. 13A.

For comparison, an as-synthesized DSVO XRD scan is illustrated in prior art FIGS. 13A and 13B. An as-synthesized CSVO XRD scan is illustrated in prior art FIGS. 14A and 14B. XRD scans of as-synthesized DSVO have an unresolvable peak 108 between about 23° (2θ) and about 25° (2θ), whereas as-synthesized CSVO XRD scans have a dual peak 208 between about 23° (2θ) and about 25° (2θ). As best seen in FIG. 14B, CSVO XRD peak 110 is indexed on a C-entered monoclinic cell at about 23.6° (2θ), which corresponds to a {002} crystallographic plane. Peak 112 is indexed on a C-centered monoclinic cell at about 24.0° (2θ), which corresponds to a {201} crystallographic plane. Because XRD analysis is indicative of the crystal structure of a material, it is desirable to have two resolvable peaks 110, 112 at about 23° (2θ) to about 25° (2θ) in an SVO XRD scan. By comparing exploded views of the XRD scans for the two materials, as illustrated in FIGS. 13B and 14B, it can be seen that the main peak 208 for as-synthesized CSVO consists of two adjacent peaks 110 and 112 with a valley 114 between the adjacent peaks 110 and 112. This characteristic of the XRD scan indicates the preferred crystallographic structure of as-synthesized CSVO, as compared to as-synthesized DSVO. Also, FIG. 13A of as-synthesized DSVO includes XRD peaks that cannot be indexed on a C-centered monoclinic cell, and are therefore attributed to impurities. Thus, it is desirable to transform as-synthesized DSVO into an improved material, having crystallographic properties similar to those of as-synthesized CSVO prepared according to the method of U.S. Pat. No. 5,221,453 (Crespi). Because XRD analysis is indicative of the crystal structure of a material, it is desirable to have a dual peak with a valley between the adjacent peaks in the main peak for an XRD scan, in order to resemble the advantageous crystallographic characteristics of the as-synthesized CSVO.

Preferably, the two resolvable peaks in an XRD scan of heat-treated SVO have a peak width at half height, corresponding to no greater than about 0.4° (2θ), in order to resemble the advantageous crystallographic characteristics of as-synthesized CSVO. The peak width at half height is represented by 113 in FIG. 14B. Preferably, for the {002} peak, the peak width at half height should be no greater than about 0.36 degrees (2θ) and that for the {201} peak should be no greater than about 0.19 degrees (2θ).

As previously stated, as-synthesized CSVO prepared according to U.S. Pat. No. 5,221,453 (Crespi) has been found to have a higher degree of crystallinity and higher pressed pellet density than as-synthesized DSVO. XRD analysis indicates this preferred property of CSVO and the improved DSVO of the present invention. Such XRD scans are very well-defined, with sharp peaks and a high signal-to-noise ratio. Thus, it is desirable to transform as-synthesized DSVO into an improved material, having crystallographic properties similar to those of as-synthesized CSVO prepared according to U.S. Pat. No. 5,221,453 (Crespi). XRD scans (using Cu Kα radiation) of the heat-treated SVO prepared according to the present invention have the dual peaks indexed at about 23° (2θ) to about 250(2θ) in an XRD scan, the same characteristic seen in CSVO XRD scans. Furthermore, as compared to as-synthesized DSVO XRD scans, the heat-treated DSVO XRD scans are much better defined, with sharp peaks and a relatively high signal-to-noise ratio. This is shown by comparing FIGS. 15–17 to prior art FIGS. 13–14.

Figure 15A:
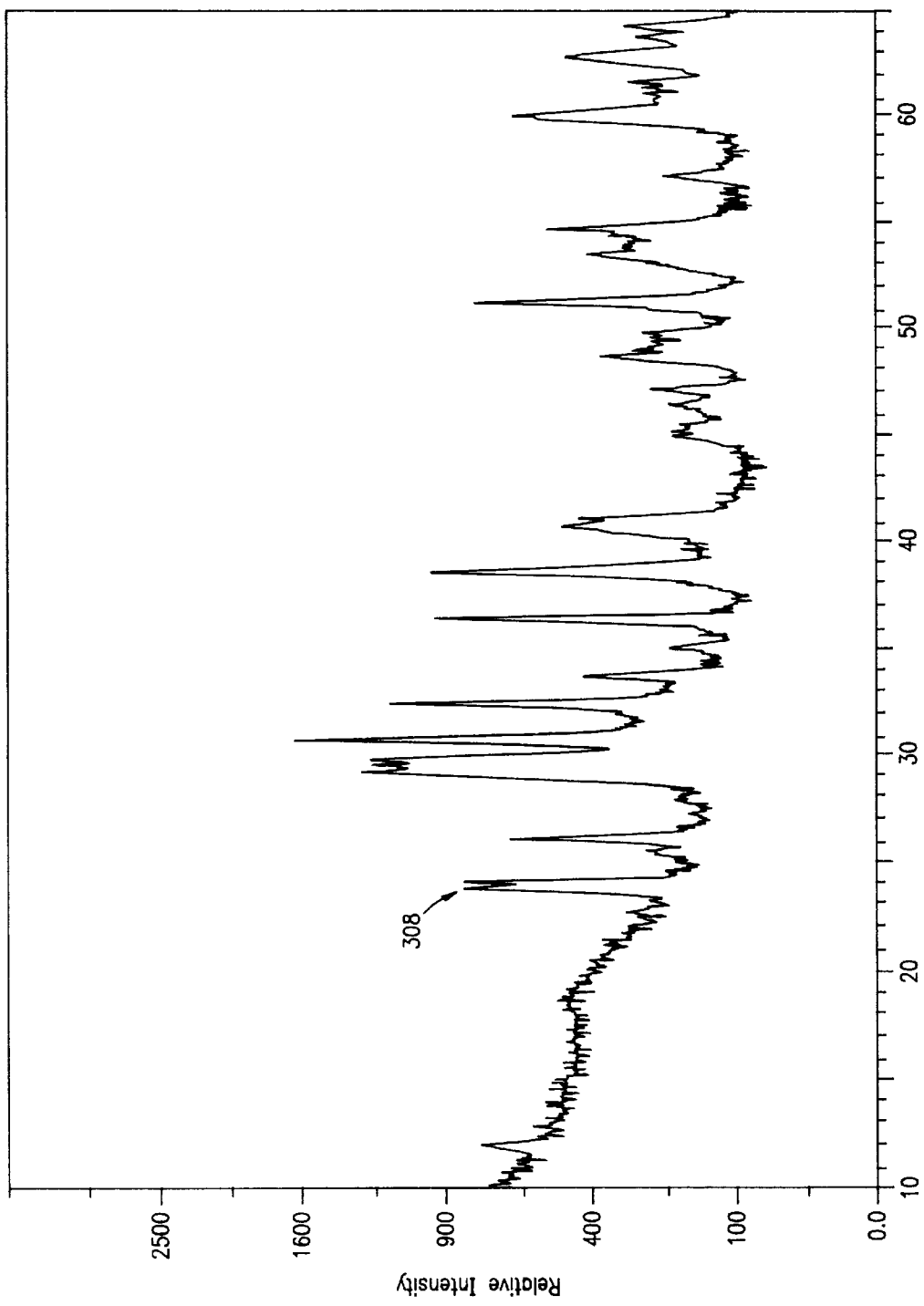
FIG. 15A is an XRD scan (Cu Kα radiation) of heat-treated DSVO in accordance with the present invention, wherein as-synthesized DSVO of FIGS. 13A and 13B was heat-treated at 500° C. for 0.5 hour under $O_2$ flow.
Figure 15B:
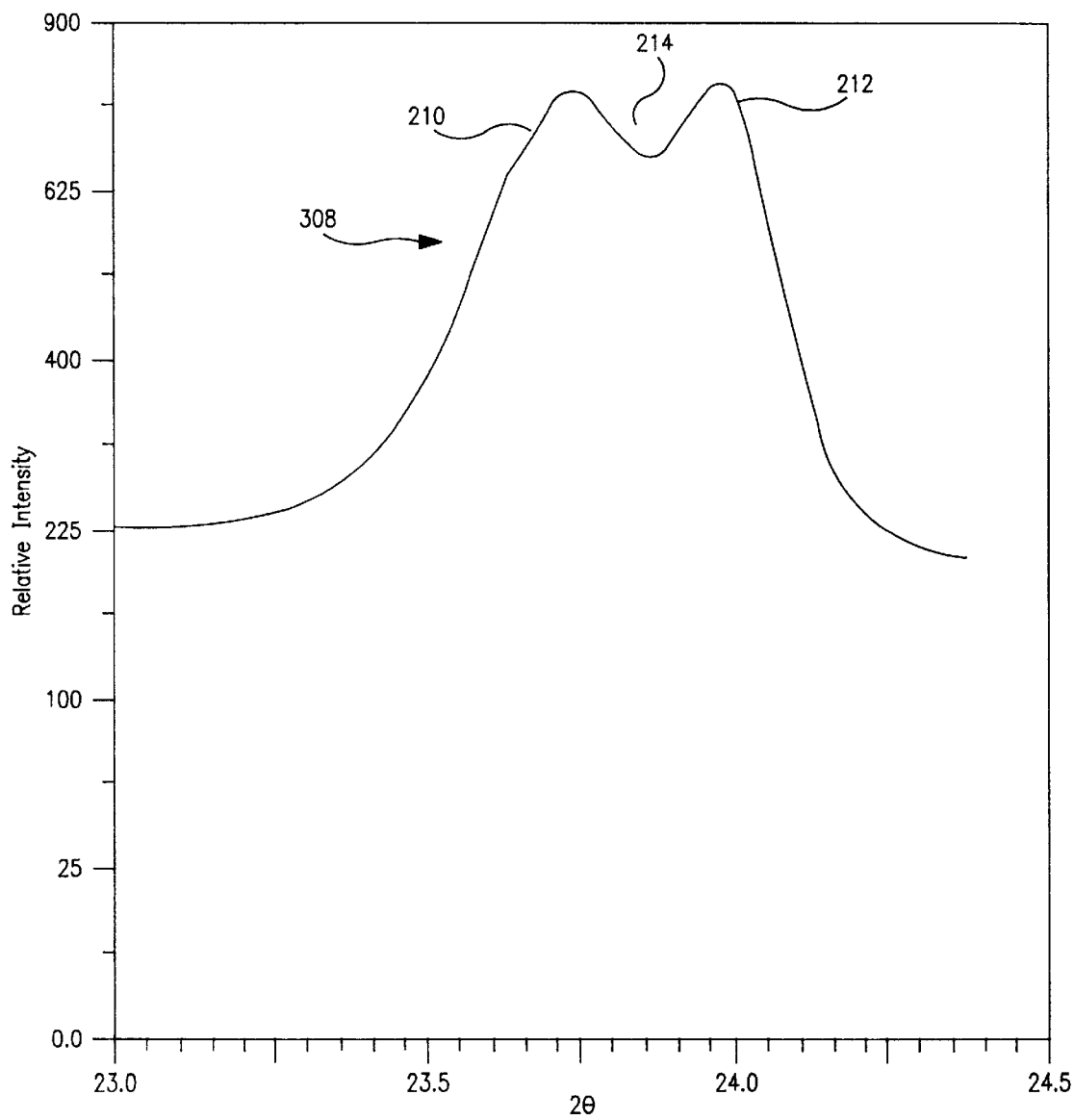
FIG. 15B is an exploded view of the XRD scan of FIG. 15A.
Figure 16B:
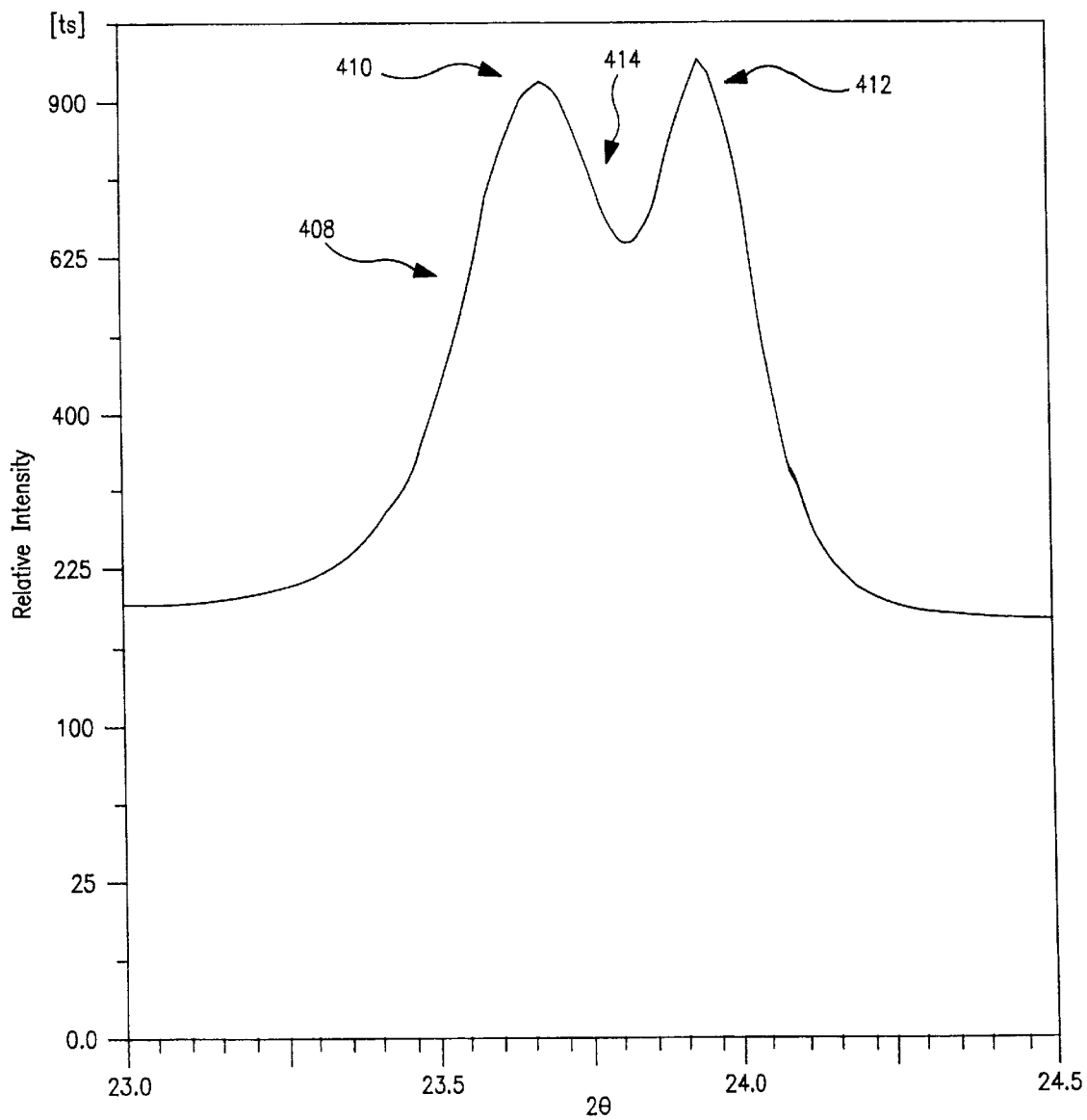
FIG. 16B is an exploded view of the XRD scan of FIG. 16A.
Figure 17:
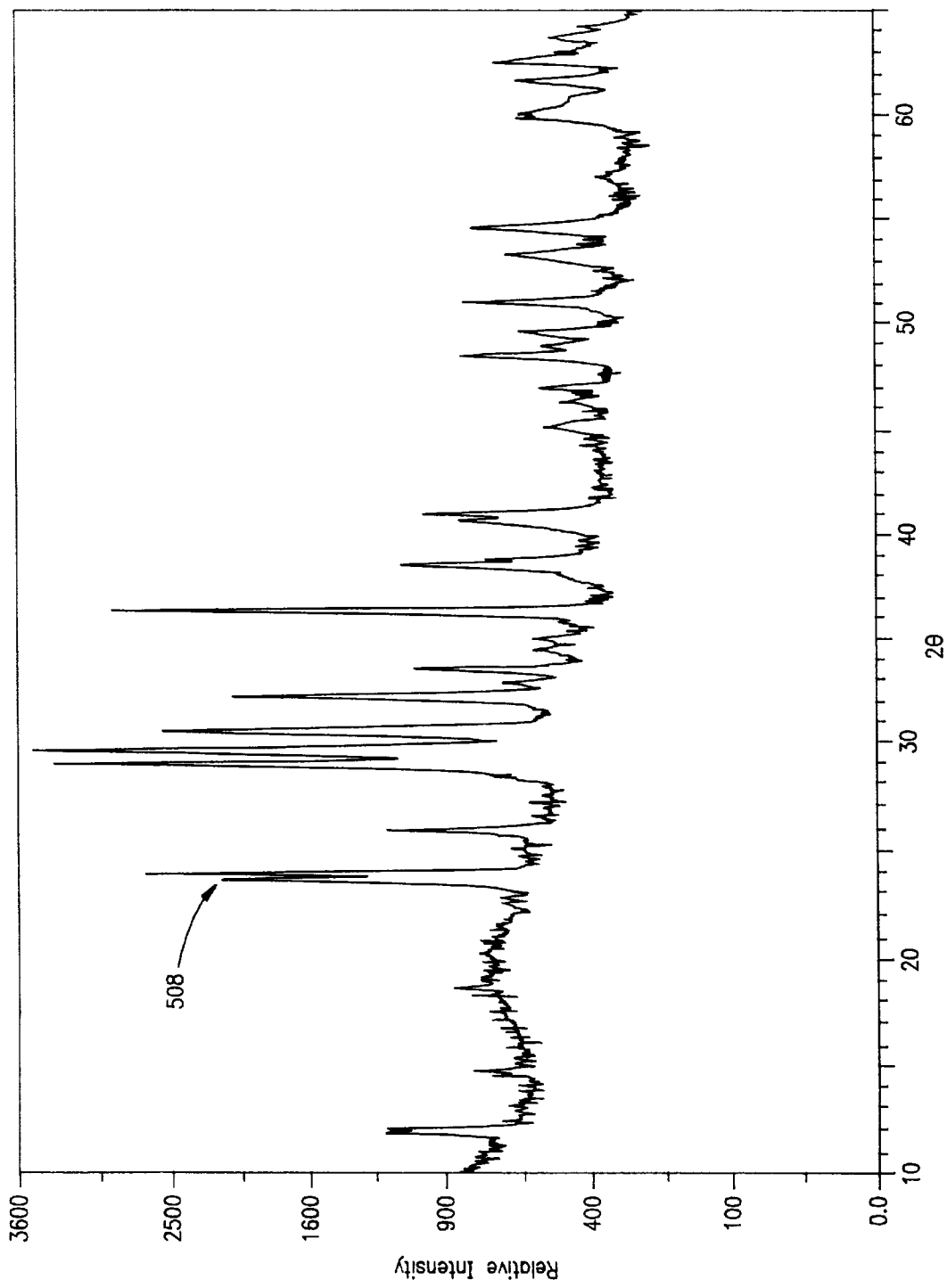
FIG. 17 is an XRD scan (Cu Ka radiation) of heat-treated DSVO in accordance with the present invention, wherein as-synthesized DSVO of FIGS. 13A and 13B was heat-treated at 580° C. for 2 hours under $O_2$ flow.

FIG. 15A is an XRD scan of heat-treated DSVO in accordance with the present invention, wherein as-synthesized DSVO (the XRD scan of which is shown in FIG. 13) was heat-treated at 500° C. for 0.5 hour under $O_2$ flow. FIG. 15B is an exploded view of the XRD scan of FIG. 15A. By analyzing the main peak 308 of the XRD scan, it can be seen that the main peak 308 consists of two adjacent peaks 210 and 212 with a valley 214 between the peaks 210 and 212. FIG. 16A is an XRD scan of heat-treated DSVO in accordance with the present invention, wherein as-synthesized DSVO (the XRD scan of which is shown in FIG. 13) was heat-treated at 500° C. for 2 hours under $O_2$ flow. FIG. 16B is an exploded view of the XRD scan of FIG. 16A. By analyzing the main peak 408 of the XRD scan, it can be seen that the main peak 408 consists of two adjacent peaks 310 and 312 with a valley 314 between the peaks 310 and 312. The valley 314 is slightly more pronounced for the XRD scan of FIG. 16B, as compared to the XRD scan of FIG. 15B. This indicates that the longer heat treatment duration results in a crystallographic structure more similar to that of as-synthesized CSVO. FIG. 17 is an XRD scan of heat-treated DSVO in accordance with the present invention, wherein as-synthesized DSVO (the XRD scan of which is shown in FIG. 13) was heat-treated at 580° C. for 2 hours under $O_2$ flow. It can be seen that the main peak 508 has a much more pronounced valley than the main peaks illustrated in XRD scans from as-synthesized DSVO heat-treated at lower temperatures. The material represented by FIG. 16A is particularly preferred.

As stated above, it is preferable to utilize a decomposition reaction to produce SVO because lower synthesis temperatures can be used. By utilizing lower temperatures, smaller crystallites can be produced. Smaller crystallite SVO results in higher rate capability electrochemical cells due to the larger surface area of the crystallites within the cathode material therein. However, as previously described, a wide variety of SVO materials can be heat-treated in accordance with the present invention, with the crystallite size tailored to the desired use.

Another useful method for characterizing the improved SVO is by taking comparative pressed pellet density measurements of pressed SVO pellets. As-synthesized DSVO has a pressed pellet density of about 3.03–3.06 g/cm³ when about 2 grams are uniaxially pressed into a pellet using a 0.625 inch (1.6 cm) diameter cylindrical die with a 7,500 pound (3400 kg) force applied for 5 seconds. By heat treating as-synthesized DSVO according to the method of the present invention, the pressed pellet density increases to at least about 3.10 g/cm³, and even as high as about 3.45 g,cm³ when using the same pressing conditions. By comparison, as-synthesized CSVO typically has a pressed pellet density of greater than about 3.5 g/cm³ when using the same pressing conditions. The higher pressed pellet density of heat-treated SVO results in increased energy capacity when such SVO is utilized as the cathode material in electrochemical cells and batteries. For example, batteries using heat-treated SVO in accordance with the present invention have about 13% more power than conventional as-synthesized DSVO batteries, resulting in a respective increase in energy capacity.

Heat-treated SVO made according to the method of the present invention is advantageously used as the cathode material in an electrochemical cell. Typically, an electrochemical cell comprises an anode and a cathode contained in an electrochemical cell body. An electrolyte typically separates the anode and the cathode and provides contact between the anode and the cathode. The electrolyte can be an organic or inorganic material, and can be in either the solid or liquid state. An electrochemical cell operates by developing a differential electrical potential between the cathode and the anode. The anode oxidizes to form metal ions during discharge of the cell. Li is preferred as the anode material due to its strong electropositivity; however, other metals can be used for the anode material, including calcium, magnesium, aluminum, and zinc, for example. The cathode converts the metal ions to atomic or molecular forms, thereby conducting an electrical current through the cell.

Typically, to form the cathode from the SVO, the SVO is pressed into a desired configuration, such as a pressed pellet, using conventional techniques. For example, the SVO can be dry-pressed or pressed with a small addition of, for example, a liquid electrolyte, a binder (e.g., polytetrafluoroethylene, methyl cellulose, ethylene propylene diene terpolymer (EPDM), polyethylene, polypropylene, polyolefins, fluorinated ethylene propylene (FEP), polyvinylidene fluoride, or mixtures thereof), a conductivity enhancing additive or agent (e.g., graphite powder, carbon black, acetylene black powder, or mixtures thereof), and a surfactant. A wide variety of other additives can be added to the SVO prior to pressing it into the desired configuration as well.

A plurality of electrochemical cells can be connected to form an electrode assembly in a battery. The SVO cathode material made according to the method of the present invention can be incorporated into a wide variety of batteries, such as, for example, those shown in U.S. Pat. Nos. 5,458,997 (Crespi et al.), U.S. Pat. No. 4,830,940 (Keister et al.), U.S. Pat. No. 4,964,877 (Keister et al.) and 5,439,760 (Howard et al.).

Figure 18A:
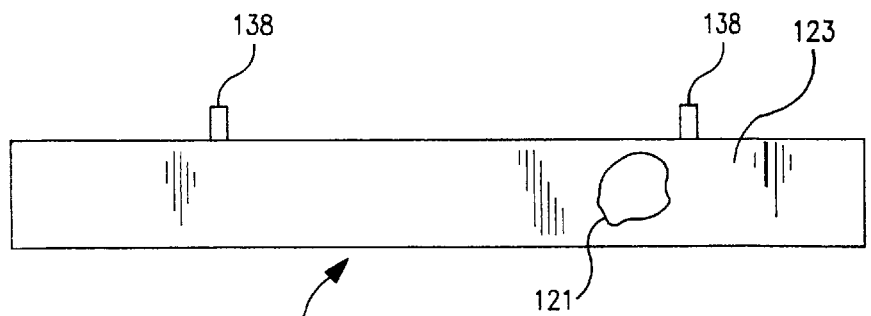
FIG. 18A is a partially cut-away side view of a cathode assembly incorporating heat-treated SVO in accordance with the present invention.
Figure 18B:
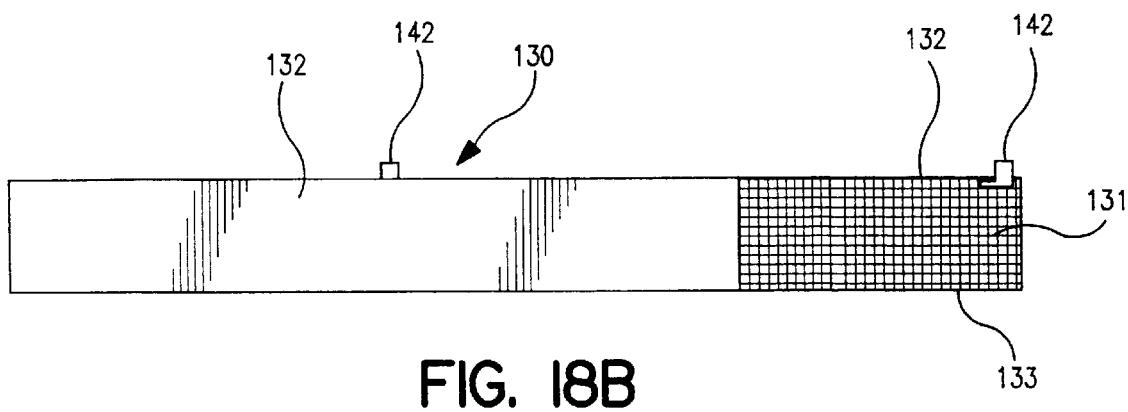
FIG. 18B is a partially cut-away side view of an anode assembly used with the cathode assembly of FIG. 18A.
Figure 19:
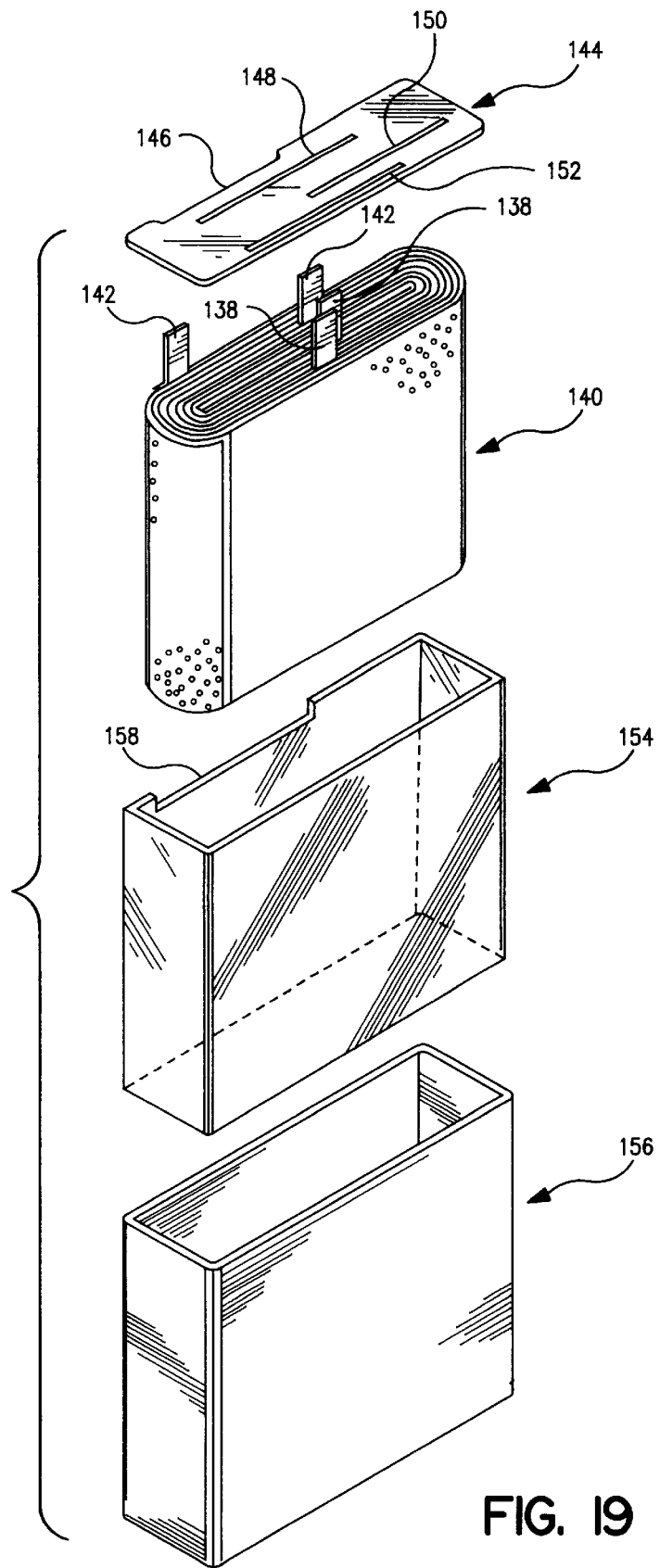
FIG. 19 is a perspective view of a single-cell battery incorporating heat-treated SVO in accordance with the present invention.

A specific example of an electrochemical cell in a single-cell battery is shown in FIG. 19, the cathode and anode of which are shown in FIGS. 18A and 18B. In this embodiment, a coiled electrode assembly comprised of elongated anode and cathode subassemblies pressed onto a metal current collector and enveloped with a separator of microporous material are overlaid with respect to each other and coiled up. Greater details for this cell are provided in U.S. Pat. No. 5,439,760 (Howard et al.).

Briefly, with respect to FIG. 18A, which shows an elongated cathode assembly 120, the cathode assembly 120 includes a current collector 121 (e.g., titanium, stainless steel, or another conductive metal that is corrosion-resistant when associated with the cathode material), onto which two layers of a cathode material containing heat-treated SVO are pressed. Only one layer of this cathode material (123) is shown in FIG. 18A. The other layer is on the opposite side of the current collector 121. The heat-treated SVO is typically combined with a binder, such as polytetrafluoroethylene, along with carbon black and graphite as conductivity enhancers, dried to a desired moisture content, placed in a uniform layer over the current collector 121, and then dried to form each of the cathode material layers (e.g., 123). Connector tabs 138 project from the edge of the current collector 121.

Briefly, with respect to FIG. 18B, which shows an elongated anode assembly 130, the anode assembly 130 includes a screen current collector 131 (e.g., nickel, copper, or another conductive metal that is corrosion-resistant when associated with the alkali metal), which has a first layer of alkali metal 132 on one side and a second layer of alkali metal on the opposite side (not shown). The alkali metal is preferably lithium metal or an alloy of lithium pressed onto the screen current collector 131. In this embodiment, the anode assembly 130 has at one end 133 only alkali metal 132. The bare portion of the current collector 131 will from the outer wrap of the wound electrode assembly as no active material is required for that surface. Connector tabs 142 project from the edge of the current collector 131.

To further complete the assembly of one embodiment of a battery in accordance with the present invention, each of the anode and cathode structures in the electrode assembly 140 is typically encased in a separator material, such as polypropylene or polyethylene, as is further discussed in U.S. Pat. No. 5,439,760 (Howard et al.). A coil insulator 144 is then placed over the electrode assembly 140. The coil insulator 144 includes a notch 146 and a slit 148 to accommodate anode lead portions 142. The coil insulator 144 further includes slits 150 and 152 to accommodate cathode lead portions 138. The electrode assembly 140 is inserted in an insulative case liner 154, which is then inserted in a case 156. The insulative case liner 154 preferably extends at its top edge above the edge of the electrode assembly 131 in order to provide an overlap with other insulative elements. It may also include a notch 158 on one side in order to allow easy connection of the anode lead portions 142 to the case 156. The coil insulator 144 and case liner 154 are preferably made from a polyolefin polymer or a fluoropolymer, such as ethylene tetrafluoroethylene copolymer (ETFE). The case 156 is preferably made of stainless steel or titanium.

It is to be understood that many other battery configurations can be formed with the improved cathode material in accordance with the present invention. Such batteries can be discharged by a number of methods, including, for example, connecting the terminals of the battery to an external resistor, or simply withdrawing a constant current.

Electrochemical cells according to the present invention can be used in batteries such as those utilized in implantable cardiac defibrillators 160, as illustrated in FIG. 1. FIG. 1 illustrates a defibrillator and lead set according to the present invention. The ventricular lead includes an elongated insulative lead body 16, carrying three concentric coiled conductors, separated from one another by tubular insulative sheaths. Located adjacent the distal end of the lead are a ring electrode 24, an extendible helix electrode 26 mounted retractably within an insulative electrode head 28, and an elongated coil electrode 20. Each of the electrodes is coupled to one of the coiled conductors within lead body 16. Electrodes 24 and 26 are employed for cardiac pacing and for sensing ventricular depolarizations. At the proximal end of the lead is a bifurcated connector 14 which carries three electrical connectors, each coupled to one of the coiled conductors. The defibrillation electrode 20 may be fabricated from platinum, platinum alloy or other materials known to be usable in implantable defibrillation electrodes and may be about 5 cm in length.

The atrial/SVC lead includes an elongated insulative lead body 15, carrying three concentric coiled conductors, separated from one another by tubular insulative sheaths, corresponding to the structure of the ventricular lead. Located adjacent the J-shaped distal end of the lead are a ring electrode 21 and an extendible helix electrode 17, mounted retractably within an insulative electrode head 19. Each of the electrodes is coupled to one of the coiled conductors within the lead body 15. Electrodes 17 and 21 are employed for atrial pacing and for sensing atrial depolarizations. An elongated coil electrode 23 is provided, proximal to electrode 21 and coupled to the third conductor within the lead body 15. Electrode 23 preferably is 10 cm in length or greater and is configured to extend from the SVC toward the tricuspid valve. In one preferred embodiment tested by the inventors, approximately 5 cm of the right atrium/SVC electrode was located in the right atrium, with the remaining 5 cm located in the SVC. At the proximal end of the lead is a bifurcated connector 13 which carries three electrical connectors, each coupled to one of the coiled conductors.

The coronary sinus lead includes an elongated insulative lead body 6, carrying one coiled conductor, coupled to an elongated coiled defibrillation electrode 8. Electrode 8, illustrated in broken outline, is located within the coronary sinus and great vein of the heart. At the proximal end of the lead is a connector plug 4 which carries an electrical connector, coupled to the coiled conductor. The coronary sinus/great vein electrode 8 may be about 5 cm in length.

An implantable pacemaker/cardioverter/defibrillator 10 is shown in combination with the leads, with the lead connector assemblies 4, 13 and 14 inserted into the connector block 12. Optionally, insulation of the outward facing portion of the housing 11 of the pacemaker/cardioverter/defibrillator 10 may be provided using a plastic coating, for example parylene or silicone rubber, as is currently employed in some unipolar cardiac pacemakers. However, the outward facing portion may instead be left uninsulated, or some other division between insulated and uninsulated portions may be employed. The uninsulated portion of the housing 11 optionally serves as a subcutaneous defibrillation electrode, used to defibrillate either the atria or ventricles. Other lead configurations and electrode locations may of course be substituted for the lead set illustrated. For example, atrial defibrillation and sensing electrodes might be added to either the coronary sinus lead or the right ventricular lead instead of being located on a separate atrial lead, thereby allowing for a two-lead system.

Such batteries must be reliable because defibrillators are used to prevent death from lethal arrhythmia. Defibrillators often operate in combination with a pacemaker. During operation, defibrillators continuously monitor a patient's heart rate. Thus, it is important that such implantable batteries be able to deliver a pulsing current with a minimal voltage drop during the pulse. Thus, it is important that batteries used in such devices do not have a high increase in internal resistance over discharge time of the battery.

Figure 20:
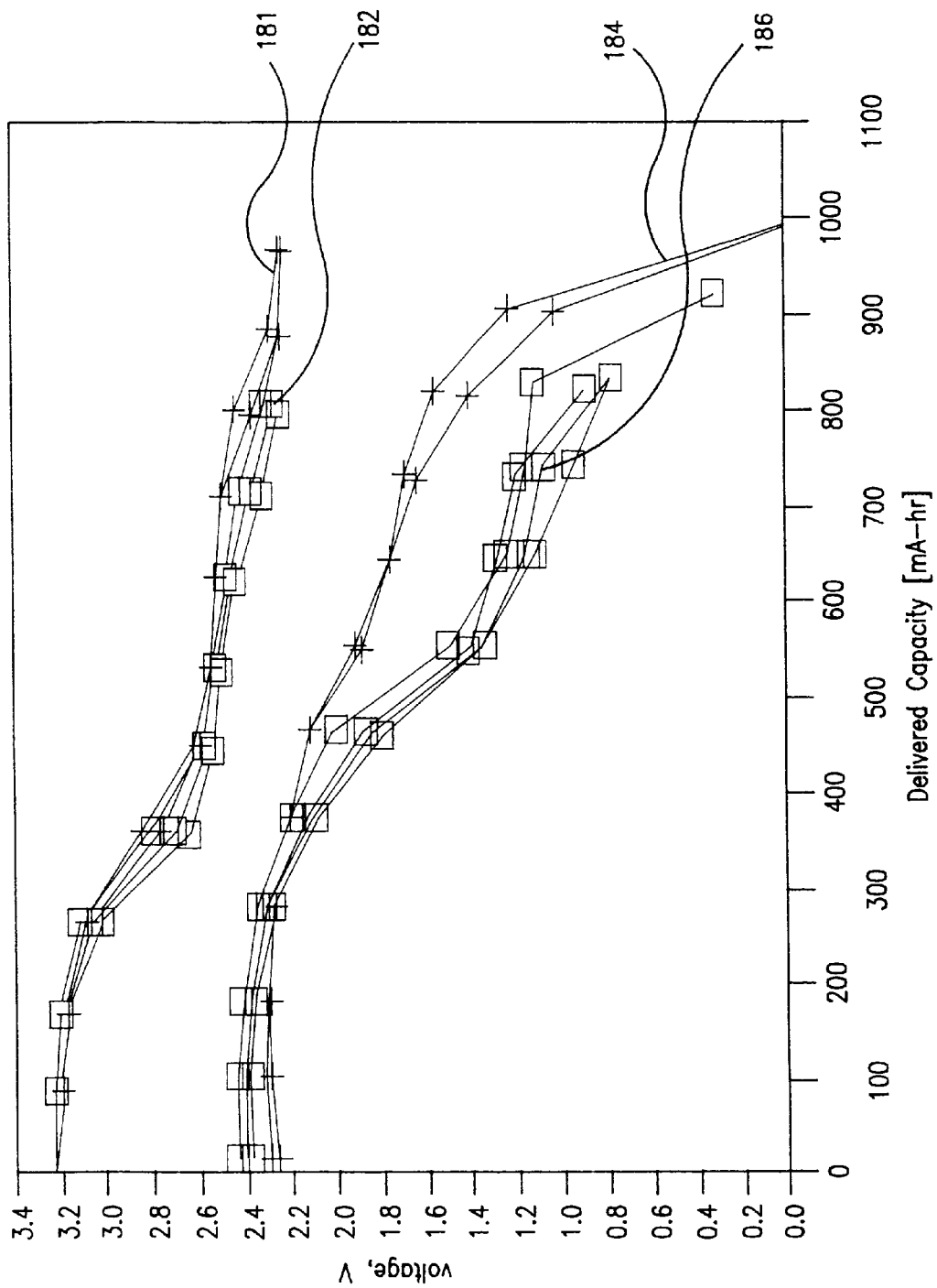
FIG. 20 is a graphical representation of comparative voltage versus delivered capacity for as-synthesized DSVO and improved DSVO cathode electrochemical cells in accordance with the present invention, wherein curves 181 and 182 illustrate background voltage at 28 k-Ω and curves 184 and 186 illustrate the minimum fourth pulse voltage produced with a current of 1.6 A.

The increased crystallinity of heat-treated SVO in accordance with the present invention contributes to chemical stability of the material when used in electrochemical cells. This can be seen by referring to FIG. 20. FIG. 20 is a graphical representation of comparative voltage versus delivered capacity for as-synthesized DSVO and heat-treated DSVO cathode electrochemical cells in accordance with the present invention, wherein curves 181 and 182 illustrate background voltage at 28 k-$\Omega$ and curves 184 and 186 illustrate the minimum fourth pulse voltage produced with a current of about 1.6 A. Enhanced chemical stability leads to a dramatically lower time-dependent internal resistance beginning slightly before the second voltage plateau for electrochemical cells formed in accordance to the invention, as compared to a relatively high time-dependent increase in internal resistance that is characteristic of lithium (Li)/as-synthesized DSVO electrochemical cells. Thus, such conventional Li/as-synthesized DSVO electrochemical cells need to be replaced frequently. Due to the lower internal resistance of the present electrochemical cells containing the improved SVO, the present electrochemical cells do not need to be replaced as frequently. This is particularly advantageous when using such batteries in implantable medical devices, in which it is undesirable to have to replace batteries frequently.

Figure 21:
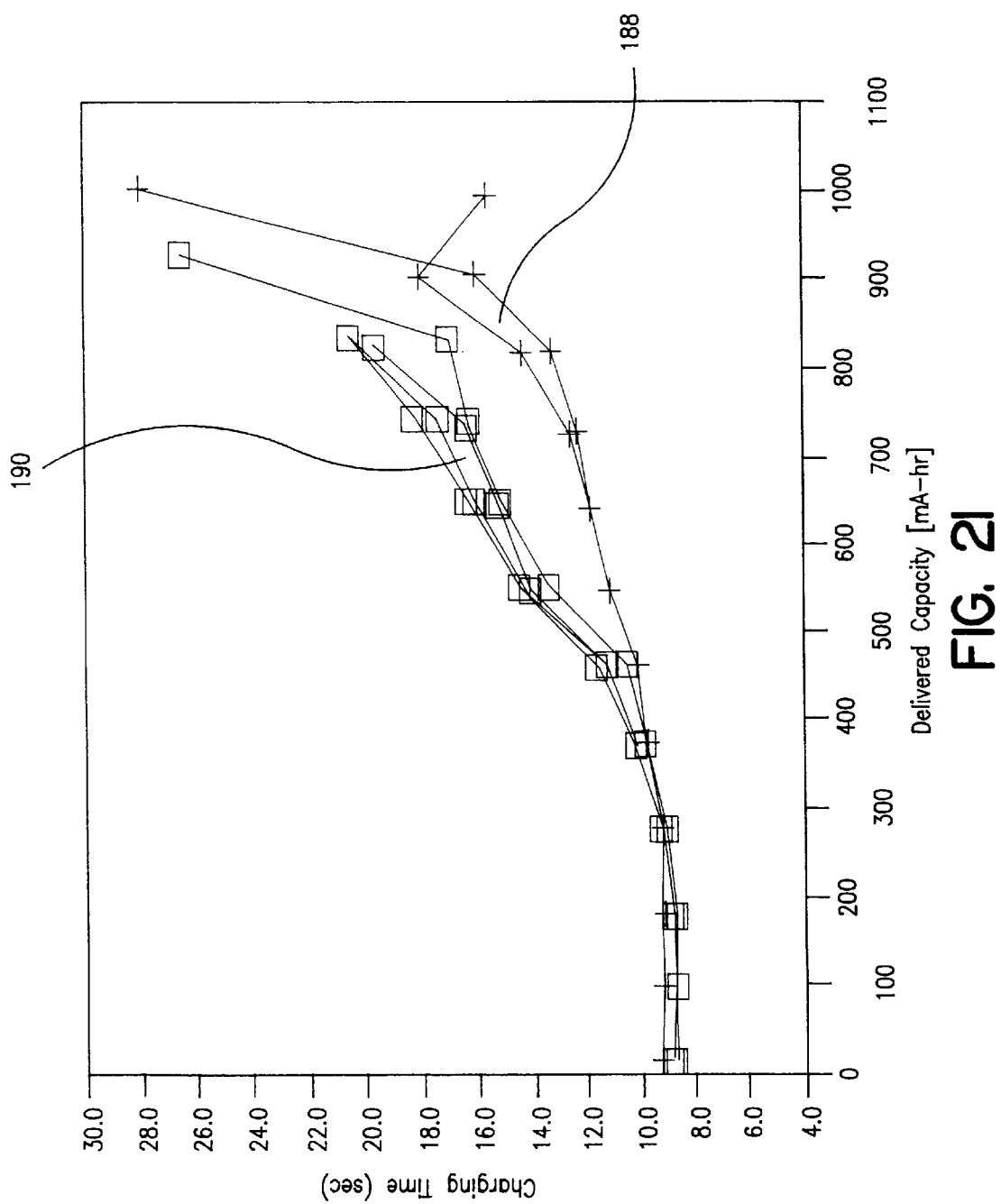
FIG. 21 is a graphical representation of charging time for the fourth pulse in a four pulse sequence versus delivered capacity for as-synthesized DSVO and improved DSVO cathode electrochemical cells in accordance with the present invention, wherein pulses of 35 J and 1.6 A were utilized.

The reduced time-dependency of electrochemical cells of the present invention also results in a comparatively shorter charge time over the extended life of the electrochemical cell. This can be seen by referring to FIG. 21. FIG. 21 is a graphical representation of charging time for the fourth pulse in a four pulse sequence versus delivered capacity for as-synthesized DSVO and improved DSVO cathode electrochemical cells in accordance with the present invention, wherein pulses of 35 J and 1.6 A were utilized. Curve 188 corresponds to heat-treated DSVO and curve 190 corresponds to as-synthesized DSVO. Thus, such electrochemical cells are advantageously utilized in implantable defibrillator batteries, where the batteries must be capable of providing repeated pulses having the same current amplitude. By shortening the charge time of the battery, a patient can receive medical attention more quickly. In other words, the energy capacity of electrochemical cells of the present invention is advantageously increased over conventional DSVO cathode electrochemical cells.

Specific methods and apparatus embodying the invention are described in the following examples. These examples are merely illustrative of the many possible embodiments of the invention.

EXAMPLES

Example 1

Preparation of Heat-treated DSVO for a Cathode Material

DSVO having the formula, $Ag_2V_4O_{11}$, was synthesized using the decomposition method described in U.S. Pat. No. 4,391,729 (Liang et al.). Specifically, the method of Example 1 set forth in the '729 patent was followed, with the exception that vanadium pentoxide was not synthesized as part of the experiment, but instead obtained from the Cerec Company of Milwaukee, Wis. The as-synthesized DSVO was than placed in an alumina crucible in a Lindberg GS tube furnace. The furnace was purged with $O_2$ for one hour. The tube furnace was then heated to a desired temperature at a heating rate of 5° C./minute. The as-synthesized DSVO was heat-treated at the desired temperature for a desired time under flowing $O_2$ at 100 mL/minute. The resulting heat-treated DSVO material was assembled as a cathode in a Li/SVO battery.

Example 2

Preparation of Heat-treated DSVO for a Cathode Material

DSVO having the formula, $Ag_2V_4O_{11}$, was synthesized using the decomposition method described in U.S. Pat. No. 4,391,729 (Liang et al.). Specifically, the method of Example 1 set forth in the '729 patent was followed, with the exception that vanadium pentoxide was not synthesized as part of the experiment, but instead obtained from the Cerec Company of Milwaukee, Wis. The as-synthesized DSVO sample was loaded into a "PYREX" tube in an air environment. The as-synthesized DSVO in the "PYREX" tube was then placed in the tube furnace. The tube pressure was reduced to 300 mTorr and heat-sealed. The furnace was then heated to a desired temperature at a heating rate of 5° C./minute. The resulting heat-treated DSVO material was assembled as a cathode in a Li/SVO battery.

Example 3

Preparation of Heat-treated DSVO for a Cathode Material

DSVO having the formula, $Ag_2V_4O_{11}$, was synthesized using the decomposition method described in U.S. Pat. No. 4,391,729 (Liang et al.). Specifically, the method of Example 1 set forth in the '729 patent was followed, with the exception that vanadium pentoxide was not synthesized as part of the experiment, but instead obtained from the Cerec Company of Milwaukee, Wis. The as-synthesized DSVO sample was loaded into a "PYREX" tube in an air environment. The as-synthesized DSVO in the "PYREX" tube was then placed in the tube furnace. The tube furnace was purged with pure $O_2$ gas for 5 minutes. The furnace pressure was reduced to 1 Torr and heat-sealed. The furnace was then heated to a desired temperature at a heating rate of 5° C./minute. The resulting heat-treated DSVO material was assembled as a cathode in a Li/SVO battery.

Example 4

Sieve Size Distribution Analysis

Figure 9:
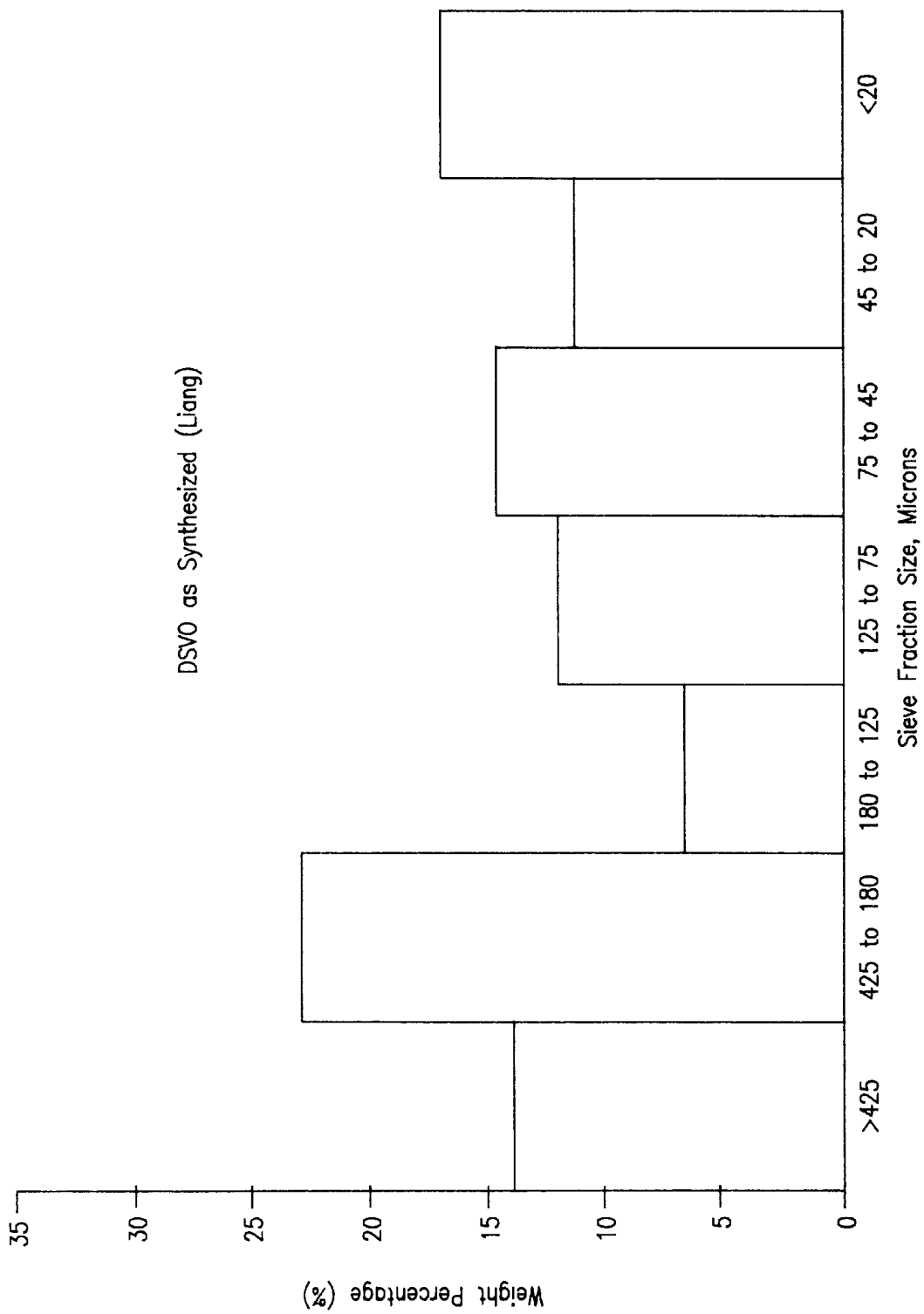
FIG. 9 is a sieve fraction size distribution of as-synthesized DSVO made according to Example No. 1 of U.S. Pat. No. 4,391,729 (Liang et al.), with the exception that vanadium pentoxide was not synthesized as part of the experiment, but instead obtained from the Cerec Company of Milwaukee, Wis.
Figure 10:
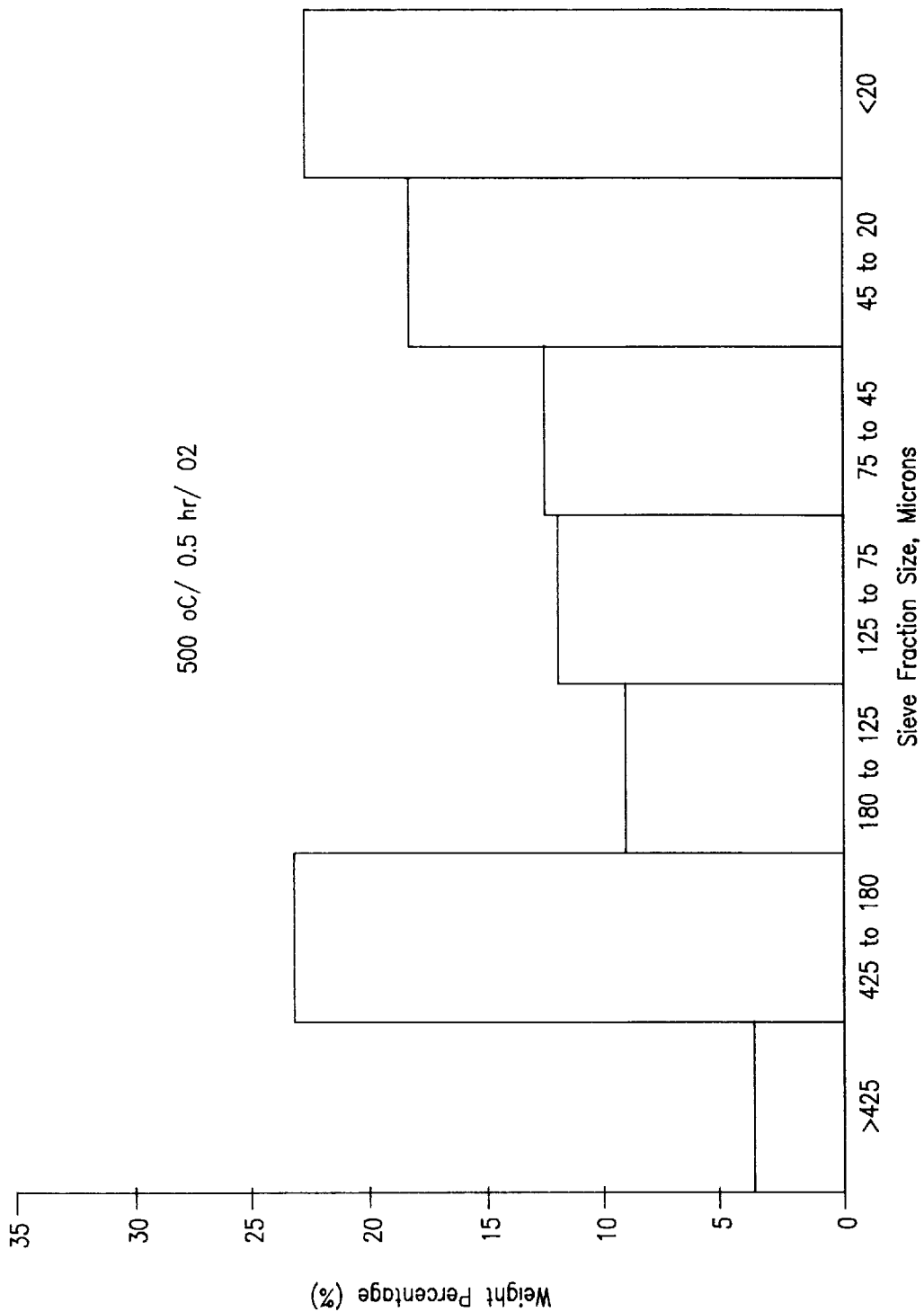
FIG. 10 is a sieve fraction size distribution of heat-treated DSVO in accordance with the present invention, wherein as-synthesized DSVO shown in FIG. 9 was heat-treated at 500° C. for 0.5 hour under $O_2$ flow.
Figure 11:
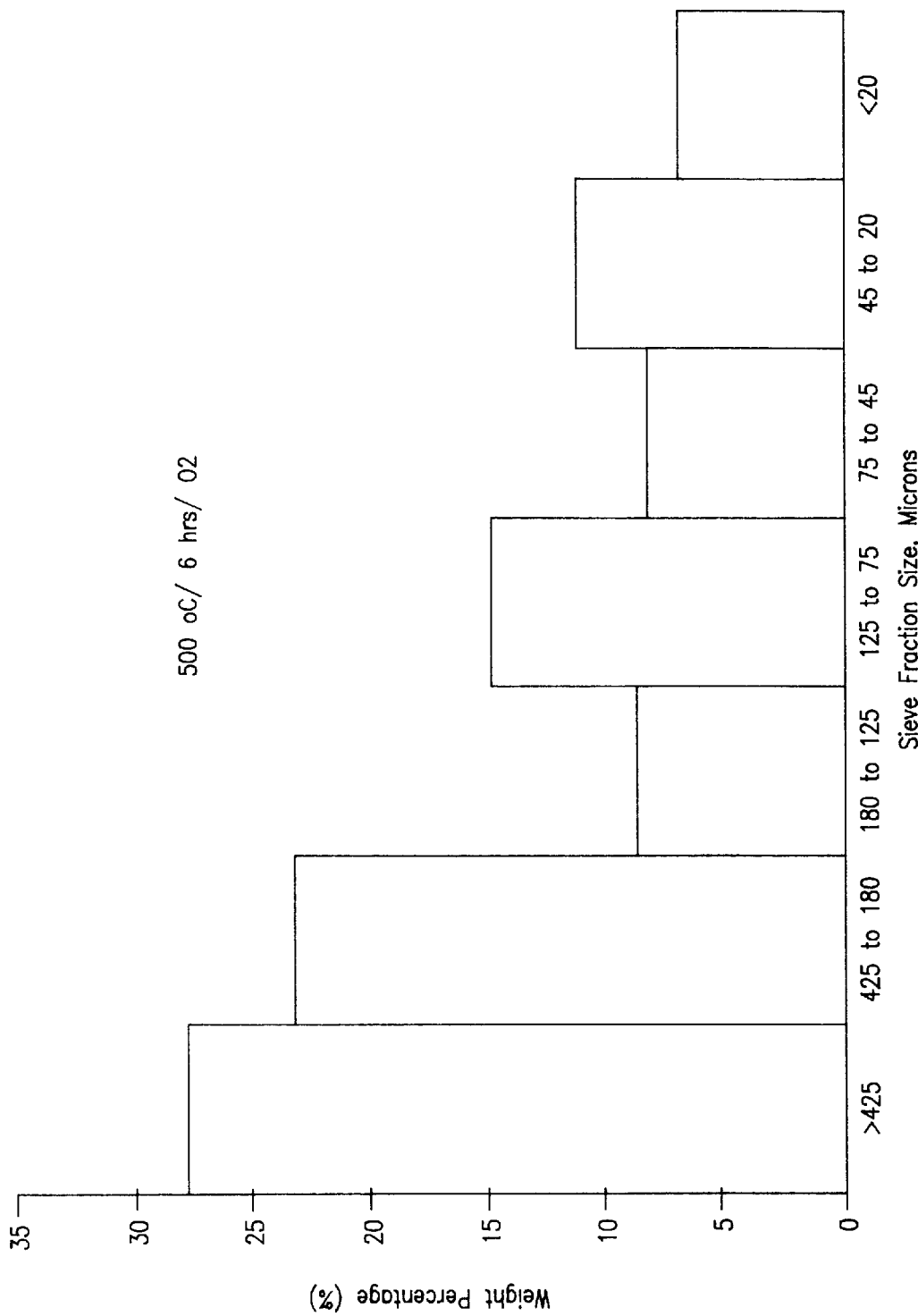
FIG. 11 is a sieve fraction size distribution of heat-treated DSVO in accordance with the present invention, wherein as-synthesized DSVO shown in FIG. 9 was heat-treated at 500° C. for 6 hours under $O_2$ flow.

Sieve size distributions were measured using an ATM Sonic Sifter set at an amplitude of 8 for 5 minutes. Sieve sizes utilized in the ATM were 425, 180, 125, 75, 45, and 20 microns. FIG. 9 illustrates the as-synthesized DSVO made according to Example 1 set forth in the '729 patent, with the exception that vanadium pentoxide was not synthesized as part of the experiment, but instead obtained from the Cerec Company of Milwaukee, Wis. FIG. 10 illustrates the resulting DSVO material heat-treated at 500° C. for 0.5 hour under $O_2$ gas flow according to Example 1. FIG. 11 illustrates the resulting DSVO material heat-treated at 500° C. for 6 hours under $O_2$ gas flow according to Example 1. The DSVO material heat-treated for the longer duration (i.e., 6 hours) has more large particles than DSVO material heat-treated for the shorter duration (i.e., 0.5 hour).

Figure 12:
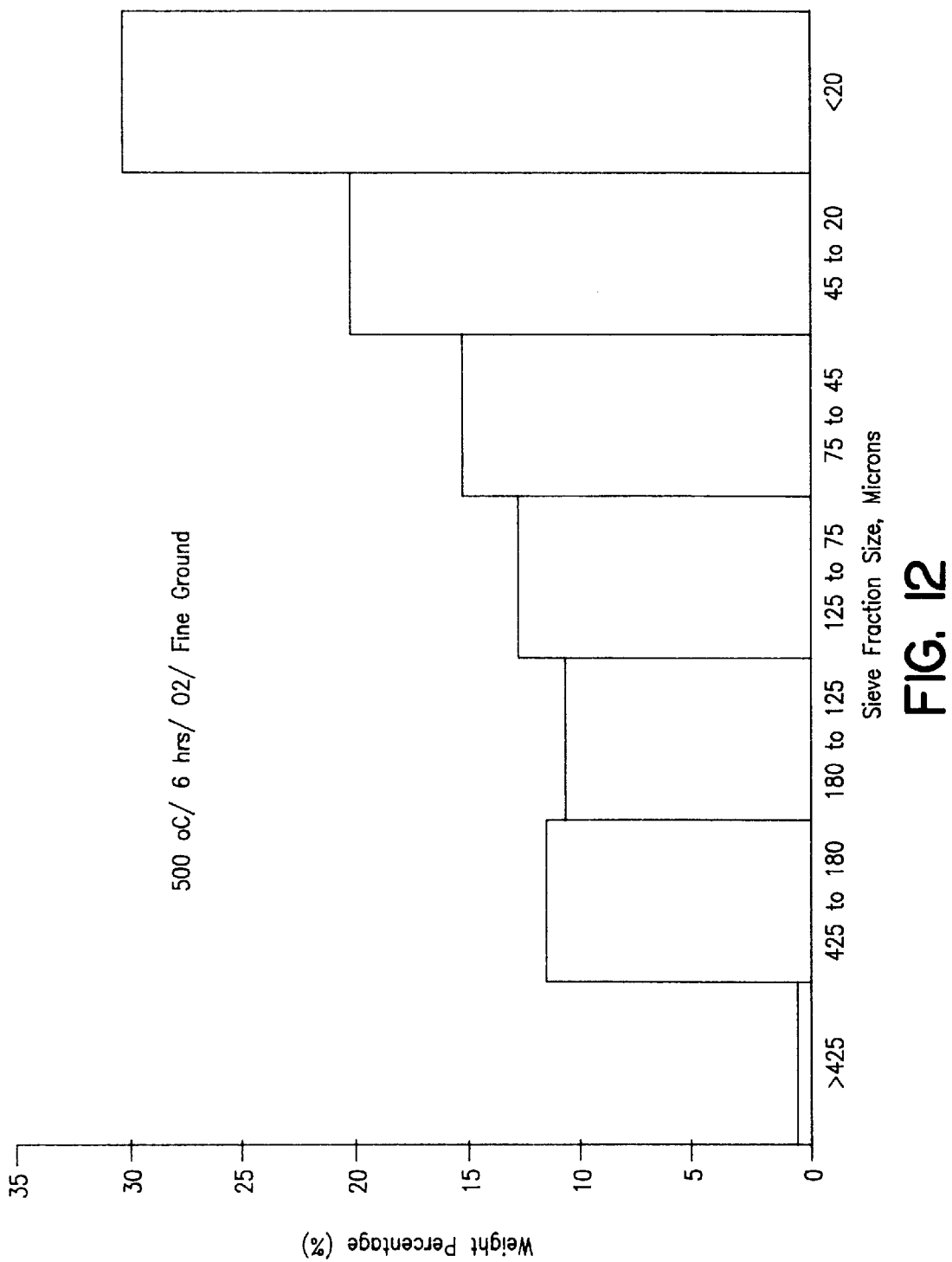
FIG. 12 is a sieve fraction size distribution of heat-treated DSVO in accordance with the present invention, wherein as-synthesized DSVO shown in FIG. 9 was finely ground and then heat-treated at 500° C. for 6 hours under $O_2$ flow.

FIG. 12 illustrates the resulting DSVO material heat-treated at 500° C. for 6 hours under $O_2$ gas flow, according to Example 1 herein (and not Example 1 of Liang), then finely ground in a mortar and pestle. FIG. 12 illustrates the effects of grinding the heat-treated DSVO. Grinding results in a finer particle size and more uniform particle size distribution in the resulting heat-treated DSVO. By comparing FIG. 12 to FIG. 11, it can be seen that the grinding can advantageously reduce the average particle size of the resulting material. Table 2 below summarizes the data presented in FIGS. 9 through 12.

TABLE 2

Sieve Fraction Size Distribution

| | Weight Percentage Heat-treated DSVO | | | |
|---|---|---|---|---|
| Diameter, Microns | DSVO | 500° C./ 0.5 hr | 500° C./ 6 hrs | 500° C./ 6 hrs/ milled |
| >425 | 13.86 | 3.59 | 27.34 | 0.32 |
| 425 to 180 | 22.85 | 22.89 | 23.07 | 11.28 |
| 180 to 125 | 8.63 | 9.05 | 8.58 | 10.70 |
| 125 to 75 | 11.99 | 11.78 | 14.69 | 12.73 |
| 75 to 45 | 14.60 | 12.28 | 8.24 | 15.04 |
| 45 to 20 | 11.20 | 18.06 | 11.10 | 20.01 |
| <20 | 16.87 | 22.33 | 6.98 | 29.90 |

Example 5

XRD Analysis

A Philips X'Pert diffractometer (Philips Electronics, Mahwa, N.J.) was used for the measurements. The data collection time used was 4 seconds per step and a step size of 0.02° (2θ). Philips PC-APD 4.0b software was used to analyze the XRD data collected. For the XRD scans presented herein, an incident beam was deflected off a copper target having a wavelength of 1.5406 angstroms to produce Cu Kα, radiation. The angle of incidence was varied to determine the distance between crystallographic planes, $d_{hkl}$.

For comparison, an as-synthesized DSVO XRD scan is illustrated in prior art FIGS. 13A and 13B. This material was synthesized according to Example 1 set forth in U.S. Pat. No. 4,391,729, with the exception that vanadium pentoxide was not synthesized as part of the experiment, but instead obtained from the Cerec Company of Milwaukee, Wis. An as-synthesized CSVO XRD scan is illustrated in prior art FIGS. 14A and 14B. This material was synthesized according to the method in col. 2, l. 41–47 of U.S. Pat. No. 5,221,453 (Crespi). XRD scans of conventional DSVO have an unresolvable peak 108 between about 23° (2θ) and about 25° (2θ), whereas conventional CSVO XRD scans have a dual peak 208 between about 23° (2θ) and about 25° (2θ). As best seen in FIG. 14B, CSVO XRD peak 110 is indexed on a C-centered monoclinic cell at about 23.6° (2θ), which corresponds to a {002} crystallographic plane. Peak 112 is indexed on a C-centered monoclinic cell at about 24.0° (2θ), which corresponds to a {201 } crystallographic plane. Because XRD analysis is indicative of the crystal structure of a material, it is desirable to have two resolvable peaks 110, 112 at about 23° (2θ) to about 25° (2θ) in a SVO XRD scan. By comparing exploded views of the XRD scans for the two materials, as illustrated in FIGS. 13B and 14B, it can be seen that the main peak 208 for as-synthesized CSVO consists of two adjacent peaks 110 and 112 with a valley 114 between the adjacent peaks 110 and 112. This characteristic of the XRD scan indicates the preferred crystallographic structure of as-synthesized CSVO, as compared to as-synthesized DSVO.

FIG. 15A is an XRD scan of heat-treated DSVO in accordance with the present invention, wherein as-synthesized DSVO (the XRD scan of which is shown in FIG. 13) was heat-treated at 500° C. for 0.5 hour under $O_2$ flow. FIG. 15B is an exploded view of the XRD scan of FIG. 15A. By analyzing the main peak 308 of the XRD scan, it can be seen that the main peak 308 consists of two adjacent peaks 210 and 212 with a valley 214 between the peaks 210 and 212. FIG. 16A is an XRD scan of heat-treated DSVO in accordance with the present invention, wherein as-synthesized DSVO (the XRD scan of which is shown in FIG. 13) was heat-treated at 500° C. for 2 hours under $O_2$ flow. FIG. 16B is an exploded view of the XRD scan of FIG. 16A. By analyzing the main peak 408 of the XRD scan, it can be seen that the main peak 408 consists of two adjacent peaks 310 and 312 with a valley 314 between the peaks 310 and 312. The valley 314 is slightly more pronounced for the XRD scan of FIG. 16B, as compared to the XRD scan of FIG. 15B. FIG. 17 is an XRD scan of heat-treated DSVO in accordance with the present invention, wherein as-synthesized DSVO (the XRD scan of which is shown in FIG. 13) was heat-treated at 580° C. for 2 hours under $O_2$ flow. It can be seen that the main peak 508 has a much more pronounced valley than the main peaks illustrated in XRD scans from as-synthesized DSVO heat-treated at lower temperatures.

Figure 14A:
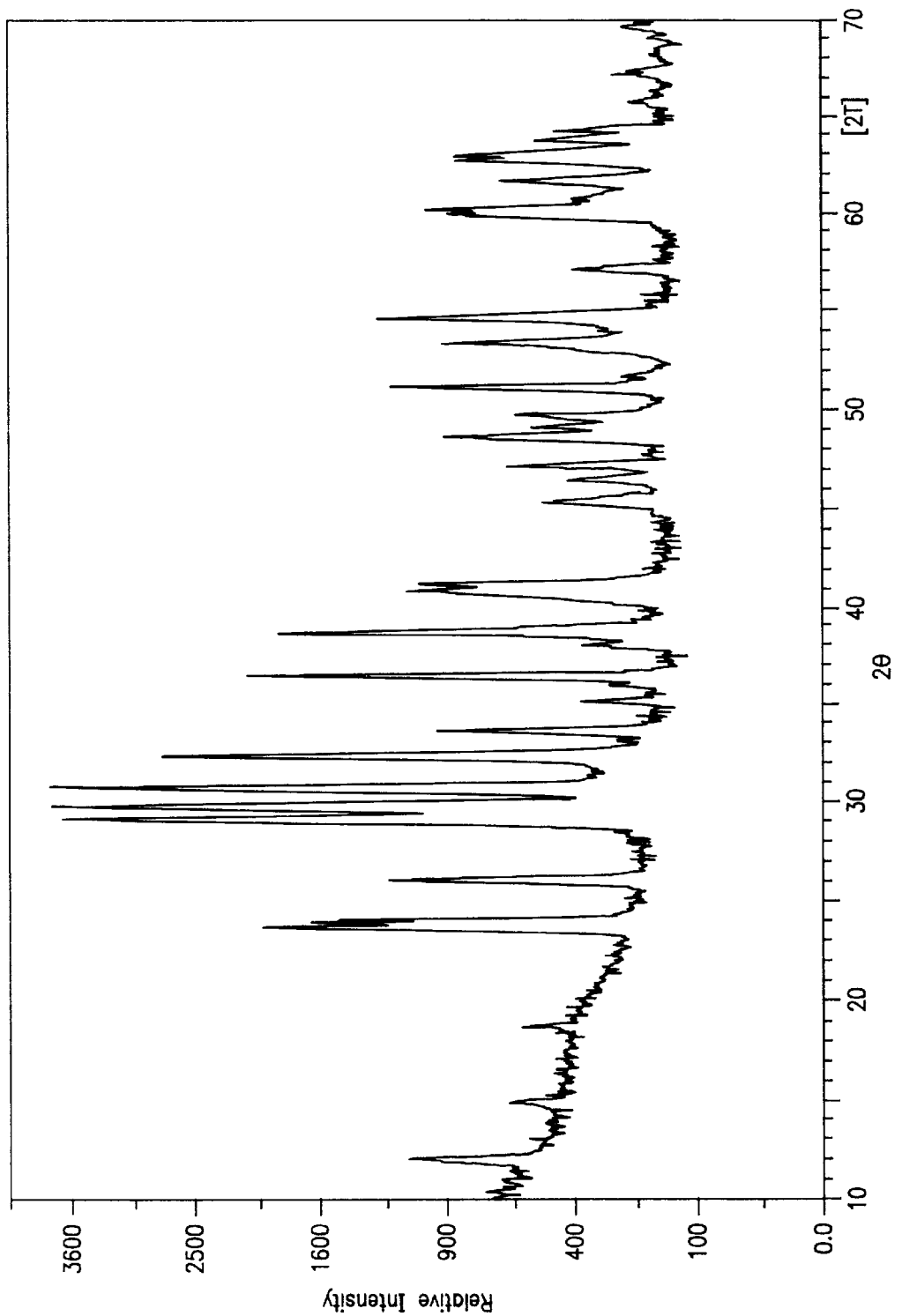
FIG. 14A is a prior art XRD scan (Cu Kα radiation) of as-synthesized CSVO made according to the method in col. 2, l. 4147 of U.S. Pat. No. 5,221,453 (Crespi).
Figure 14B:
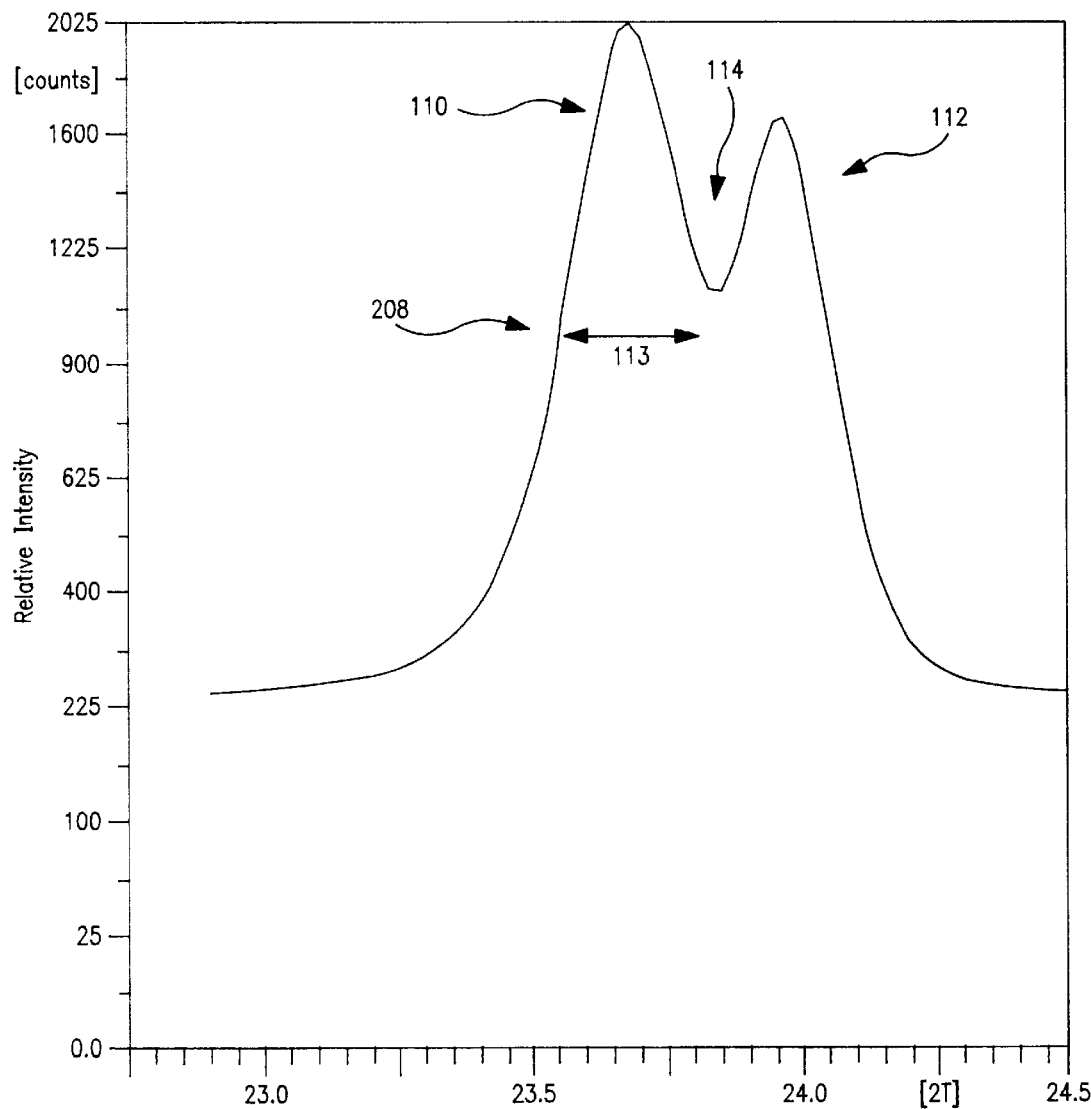
FIG. 14B is an exploded view of the prior art XRD scan of FIG. 14A.

Using Bragg's law, it was determined from FIG. 14A that the dominant phase present in CSVO, corresponding to the {002} crystallographic plane has unit cell dimensions of 1.451 nm (a), 0.35766 nm (b), and 0.9564 nm (c). It was also determined that the angle between unit sides (a) and (c) is 128.74°. The type of unit cell structure indicated by these dimensions and angle is C-centered monoclinic (i.e., having three unequal crystal axes, two of which intersect obliquely and are perpendicular to the third). The unit cell structure of SVO in general is further discussed in Zandbergen et al., "Two Structures of $Ag_{2-x}V_4O_{11}$, Determined by High Resolution Electron Microscopy," *Journal of Solid State Chemistry*, 110, 167–175 (1994).

Using Bragg's law (XRD scan not shown), it was determined that the dominant phase present in DSVO heat-treated at 500° C. for 6 hours under flowing $O_2$ had unit cell dimensions of 1.528 nm (a), 0.3756 nm (b), and 0.9480 nm (c). It was also determined that the angle between unit sides (a) and (c) is 127.76°.

Using Bragg's law, it was determined from FIG. 16A that the dominant phase present in DSVO heat-treated at 500° C. for 2 hours under flowing $O_2$ had unit cell dimensions of 1.531 nm (a), 0.35834 nm (b), and 0.9521 nm (c). It was also determined that the angle between unit sides (a) and (c) was 127.920.

Example 6

Pressed Pellet Density Analysis

Pressed pellet density measurements were performed. About 2 grams of the SVO material were pressed into the pressed pellets. Three materials were analyzed: as-synthesized DSVO, heat-treated DSVO, and as-synthesized CSVO. The heat-treated DSVO was heat treated at 500° C. for 6 hours under 100 mL/minute $O_2$ gas flow, according to Example 1. An Enerpac apparatus (Applied Power Industry, Butler, Wis.) with a 0.625 inch (1.6 cm) diameter cylindrical die and an applied force of 7,500 pounds (3400 kg) for 5 seconds under uniaxial compression was used to form the pellets. The pressed pellet density of the resulting pellets was then measured using conventional techniques. The volume was calculated from the diameter and height of the pressed pellet. The resulting pressed pellet density measurements are set forth in Table 3.

TABLE 3

Pressed Pellet Density Measurements (g/cm³)

| Material | Pressed Pellet Density Measurement 1 | Pressed Pellet Density Measurement 2 |
| --- | --- | --- |
| as-synthesized DSVO | 3.06 | 3.03 |
| heat-treated DSVO | 3.42 | 3.37 |
| as-synthesized CSVO | 3.53 | 3.53 |

As illustrated in Table 2, heat-treated DSVO has a much higher pressed pellet density than as-synthesized DSVO. The pressed pellet density of heat-treated DSVO approached that of CSVO, which has a much greater pressed pellet density than as-synthesized DSVO.

Example 7

Comparative Discharge and Charging Curves for Heat-Treated DSVO and As-Synthesized DSVO Cathode Electrochemical Cells A discharge test was conducted for an electrochemical cell with a heat-treated DSVO cathode and Li anode and compared to a similar discharge test for an electrochemical cell with an as-synthesized DSVO cathode and a Li anode. The heat-treated DSVO was heat treated at 500° C. for 6 hours under 100 mL/minute $O_2$ gas flow, according to Example 1 herein (and not Example 1 of Liang et al.). The cathode of both cells contained a titanium current collector and consisted of 91% active cathodes material, 5% polymer binder (polytetrafluoroethylene), 2% carbon black, and 2% graphite. Carbon black and graphite were added as conductivity enhancing additives or agents. (Acetylene black, petroleum coke, filamentous carbon, hairy carbon, carbon fibers, biologically derived carbon, carbon aerogel, carbon nanotubes, micro-bean carbon are other examples of less preferred conductivity enhancing additives or agents that may find use in the cathdoe of the present invention.) The electrolyte was 1.0M $LiAsF_6$ in 50% by volume propylene carbonate an 50% by volume dimethoxyethane.

The electrochemical cells were discharged at an operating temperature of 60° C. with a resistive load of 28 kohms. The electrochemical cells were pulsed monthly with a four pulse, 1.6 A, 35 J sequence.

Comparative results are illustrated in FIGS. 20 and 21. FIG. 20 is a graphical representation of comparative voltage versus delivered capacity for as-synthesized DSVO and heat-treated DSVO cathode electrochemical cells in accordance with the present invention, wherein curves 181 and 182 illustrate background voltage with a 28 k-Ω load and curves 184 and 186 illustrate the voltages produced with a current of 1.6 A. As predicted, curves 181 and 182 exhibit similar discharge profiles in respect of one another. However, curves 184 and 186 do not exhibit similar discharge profiles in respect of one another. Curve 186 exhibits a depressed voltage section beginning just before the second voltage plateau, thereby indicating an undesirable increase in internal resistance.

FIG. 21 is a graphical representation of charging time for a fourth pulse in a four pulse sequence versus delivered capacity for as-synthesized DSVO and improved DSVO cathode electrochemical cells in accordance with the present invention, wherein pulses of 35 J and 1.6 A were utilized. Curve 188 corresponds to heat-treated DSVO and curve 190 corresponds to as-synthesized DSVO. As predicted, the charging time for the electrochemical cell containing the heat-treated DSVO cathode is much less to obtain a particular delivered capacity than is the charging time for a conventional DSVO cathode electrochemical cell.

All patents, patent applications, and publications disclosed herein are incorporated by reference in their entirety, as if individually incorporated. The preceding specific embodiments are illustrative of the practice of the invention. It is to be understood, therefore, that other expedients known to those skilled in the art or disclosed herein, may be employed without departing from the invention or the scope of the appended claims. For example, the present invention is not limited to an improved cathode material for use in implantable medical devices. The present invention is also not limited to an improved cathode material for use in an electrochemical cell per se, but may find further application as a ceramic material. The present invention further includes within its scope, methods of making and using the improved SVO described hereinabove.

What is claimed is:

1. A method of forming silver vanadium oxide composition comprising:

providing as-synthesized silver vanadium oxide;

heat treating non-compressed as-synthesized silver vanadium oxide to form heat-treated silver vanadium oxide; and preparing the as-synthesized silver vanadium oxide using a decomposition reaction.

2. The method according to claim 1 wherein the as-synthesized silver vanadium oxide is prepared from decomposable silver-containing compound and a vanadium-containing compound.

3. The method according to claim 2 wherein the decomposable silver-containing compound is selected from the group of $AgNO_3$, $AgNO_2$, $Ag_2O_2$, $Ag_2CO_3$, $Ag(CH_3CO_2)$, and mixtures thereof.

4. The method according to claim 2 wherein the vanadium-containing compound is selected from the group of $NH_4VO_3$, $AgVO_3$, $V_2O_5$, $V_2O_4$, $V_6O_{13}$, $V_2O_3$, and mixtures thereof.

5. The method according to claim 1, wherein the heat-treated silver vanadium oxide has the formula $Ag_xV_4O_y$, wherein x is about 1.6 to about 2.2 and y is about 10.5 to about 11.5.

6. The method according to claim 5, wherein the silver vanadium oxide has the formula $Ag_2V_4O_{11}$.

7. The method according to claim 1, wherein the heat treating step comprises heat treating the as-synthesized silver vanadium oxide at a temperature and for a duration according to the following equation: y=0.5407+656.28/, wherein y is the duration in hours and x is the temperature in degrees Celsius of the heat treating step.

8. The method according to claim 1 wherein the heat treating step includes providing a flowing gas of oxygen.

9. The method according to claim 1 wherein the heat-treated silver vanadium oxide is defined by an x-ray diffraction scan using Cu Kα radiation, wherein the heating step includes heating step includes heating as-synthesized silver vanadium oxide to a temperature of about 500° C. for about 2 hours under $O_2$ flow.

10. The method according to claim 1 wherein the heat-treated silver vanadium oxide has an associated x-ray diffraction scan using Cu Kα radiation having a {002} peak indexed at a value of about 23.6° (2θ) and a {201} peak indexed at a value of about 24.0° (2θ) when indexed on a C-centered unit cell.

11. A method of heat treating a decomposition-produced silver vanadium oxide (DSVO), the method comprising:
   forming as-synthesized DSVO from a decomposable silver-containing compound selected from the group of $AgNO_3$, $AgNO_2$, $Ag_2O_2$, $Ag_2CO_3$, $Ag(CH_3CO_2)$, and mixtures thereof, and a vanadium-containing compound selected from the group of $NH_4VO_3$, $AgVO_3$, $V_2O_5$, $V_2O_4$, $V_6O_{13}$, $V_2O_3$, and mixtures thereof; and
   heat treating non-compressed particles of the as-synthesized DSVO at a temperature of about 390° C. to about 580° C. to form heat-treated DSVO.

12. Heat-treated silver vanadium oxide defined by an x-ray diffraction scan using Cu Kα radiation represented by FIG. 16A, and is capable of being pressed into a pellet having a pressed pellet density of about 3.10 $g/cm^3$ to about 3.45 $g/cm^3$ when about 2 grams of the heat-treated silver vanadium oxide are uniaxially pressed into a pellet using a 1.6 cm diameter cylindrical die with a 7500 pound force applied for 5 seconds.

13. Heat-treated silver vanadium oxide prepared by a method comprising:
   forming as-synthesized DSVO from a decomposable silver-containing compound selected from the group of $AgNO_3$, $AgNO_2$, $Ag_2O_2$, $Ag_2CO_3$, $Ag(CH_3CO_2)$, and mixtures thereof, and a vanadium-containing compound selected from the group of $NH_4VO_3$, $AgVO_3$, $V_2O_5$, $V_2O_4$, $V_6O_{13}$, $V_2O_3$, and mixtures thereof; and
   heat treating non-compressed particles of the as-synthesized DSVO at a temperature of about 390° C. to about 580° C. to form heat-treated DSVO.

* * * * *